United States Patent
Liu et al.

(10) Patent No.: US 8,442,106 B2
(45) Date of Patent: *May 14, 2013

(54) FLOATING-TAP DECISION FEEDBACK EQUALIZER FOR COMMUNICATION CHANNELS WITH SEVERE REFLECTION

(75) Inventors: Wing Faat Liu, Milpitas, CA (US); Freeman Y. Zhong, San Ramon, CA (US); Lizhi Zhong, Sunnyvale, CA (US); Eric Zhang, Fremont, CA (US)

(73) Assignee: LSI Corporation, San Jose, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/834,913

(22) Filed: Jul. 13, 2010

(65) Prior Publication Data

US 2011/0142120 A1 Jun. 16, 2011

Related U.S. Application Data

(60) Provisional application No. 61/286,193, filed on Dec. 14, 2009.

(51) Int. Cl.
*H04L 27/01* (2006.01)

(52) U.S. Cl.
USPC .......................................... 375/233; 375/234

(58) Field of Classification Search ................... 375/230, 375/233, 229, 234; 333/18, 28
See application file for complete search history.

(56) References Cited

U.S. PATENT DOCUMENTS

| | | | | |
|---|---|---|---|---|
| 6,012,161 | A | 1/2000 | Ariyavisitakul et al. | 714/795 |
| 6,636,561 | B1* | 10/2003 | Hudson | 375/232 |
| 6,775,335 | B2 | 8/2004 | Sommer et al. | 375/341 |
| 7,176,721 | B2 | 2/2007 | Ho et al. | 326/82 |
| 7,199,615 | B2 | 4/2007 | Stojanovic et al. | 326/82 |
| 7,333,580 | B2* | 2/2008 | Parhi | 375/371 |
| 7,446,622 | B2 | 11/2008 | Chiang | 333/18 |
| 7,450,634 | B2 | 11/2008 | Miller et al. | 375/229 |
| 7,505,512 | B1 | 3/2009 | Anderson et al. | 375/229 |
| 7,668,238 | B1* | 2/2010 | Rokhsaz | 375/233 |
| 2007/0110174 | A1* | 5/2007 | Glazko et al. | 375/260 |
| 2009/0016422 | A1 | 1/2009 | Zhong et al. | 375/233 |
| 2009/0102692 | A1* | 4/2009 | Pickering | 341/155 |

* cited by examiner

*Primary Examiner* — Shuwang Liu
*Assistant Examiner* — Helen Tayong
(74) *Attorney, Agent, or Firm* — Christopher P. Maiorana, PC

(57) ABSTRACT

An apparatus including a first circuit and a second circuit. The first circuit may be configured to determine values for a predefined metric for a plurality of tap positions within a range covered by a decision feedback equalizer (DFE). The values for a number of taps may be determined in parallel. The second circuit may be configured to set one or more floating taps of the DFE to tap positions based upon the values of the predefined metric. The floating taps in the decision feedback equalizer may be selected adaptively.

21 Claims, 15 Drawing Sheets

CHANNEL DISPERSION ISI
10

REFLECTION CAUSED DISTORTION
12

(A)

(B)

FLOATING-TAP DECISION FEEDBACK EQUALIZER FOR COMMUNICATION CHANNELS WITH SEVERE REFLECTION

RELATED APPLICATIONS

The present application claims priority to U.S. Provisional Application No. 61/286,193, filed on Dec. 14, 2009, which is incorporated herein by reference in its entirety.

The present application relates to U.S. Non-provisional application Ser. No. 11/777,337, filed Jul. 13, 2007, which is incorporated herein by reference in its entirety.

FIELD OF THE INVENTION

The present invention relates to communication systems generally and, more particularly, to a method and/or architecture for implementing a floating-tap decision feedback equalizer for communication channels with severe reflection.

BACKGROUND OF THE INVENTION

Inter symbol interference (ISI) resulting from a communications channel can greatly reduce an eye opening at an input of a receiver. A decision feedback equalizer (DFE) can be used to reduce ISI. However, reflections in the communications channel can cause ISI in a wide range of symbols. To reduce ISI in the wide range of symbols, a DFE with a large number of taps is used. The DFE with a large number of taps consumes a lot of power and area.

Reflections occur in only a few symbols of the wide range of symbols. A floating tap DFE assigns taps only to where the reflections occur. By doing so, the number of DFE taps can be significantly reduced. However, the locations of reflections can vary with channel. Even for the same channel, the reflections can change, for example, with temperature. Finding the floating tap positions for a floating tap DFE is a significant problem.

Conventional methods for finding the floating tap positions include: 1) setting the floating tap positions manually; 2) measuring a pulse response of a channel using an instrument offline and setting the floating tap positions manually based on the measured pulse response; 3) using a training sequence to estimate the pulse response of the channel and selecting the floating tap positions based on the estimated channel pulse response; 4) selecting the floating tap positions based on tap signal-to-noise ratio (SNR) or channel impulse coefficients.

The conventional methods have a number of disadvantages. There can be many channels (200+) in backplane applications. Each of the channels can have different reflection locations. Many channels with different reflection locations makes manually setting the floating tap positions impractical. Using a training sequence adds a large overhead in a Gigabit per second (Gbps) serializer/deserializer (SerDes). The training sequence interrupts normal data traffic. The training sequence can only determine the floating tap positions during initialization. If the reflection locations change due to temperature or for some other reason, the conventional methods cannot update the floating tap positions unless the data traffic is interrupted and the training sequence is inserted again. The disadvantage of basing the floating tap positions on the tap SNR or channel impulse coefficients is that the tap SNR and channel impulse coefficients are not usually available, making the use of SNR and channel impulse coefficients unrealistic.

A fully adaptive floating-tap DFE to tackle channel reflection in communication channels would be desirable.

SUMMARY OF THE INVENTION

The present invention concerns an apparatus including a first circuit and a second circuit. The first circuit may be configured to determine values for a predefined metric for a plurality of tap positions within a range covered by a decision feedback equalizer (DFE). The values for a number of taps may be determined in parallel. The second circuit may be configured to set one or more floating taps of the DFE to tap positions based upon the values of the predefined metric. The floating taps in the decision feedback equalizer may be selected adaptively.

The objects, features and advantages of the present invention include providing a method and/or architecture for implementing a floating-tap decision feedback equalizer for communication channels with severe reflection that may (i) allow the floating tap positions to be found without human intervention, (ii) be implemented without overhead, (iii) allow floating tap positions to be found online in real time without interrupting normal data traffic, (iv) allow the floating tap positions to be updated dynamically after reflections change locations, (v) provide performance similar to an N1+N2*M tap DFE using only N1+N2 taps, (vi) allow the floating tap positions to be set independently, (vii) search for the floating tap positions in parallel, (viii) significantly reduce the total search time, (ix) ensure reliable performance in the search mode with a number of fixed taps cancelling most of the ISI during each slide, (x) use a combination of fixed and floating taps to exploit channel properties and simplify implementation and/or (xi) provide increased confidence on the tap weights obtained by implementing fixed taps.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

A floating-tap decision feedback equalizer (DFE) in accordance with the present invention may be configured to cancel high-latency channel distortion from reflections. A benefit of the floating-tap DFE in accordance with the present invention may be that a small number of feedback taps may be used to accomplish the same performance as a conventional fixed-tap DFE, which requires a large number of feedback taps. Reducing the number of feedback taps may result in a simpler circuit design, higher speed and lower power consumption. The floating-tap DFE in accordance with the present invention may be implemented, in one example, in a 7.5 Gbps serializer/deserializer (SerDes) design and may allow the SerDes to operate well even in poor channels with a multitude of channel reflections.

Figure 1:
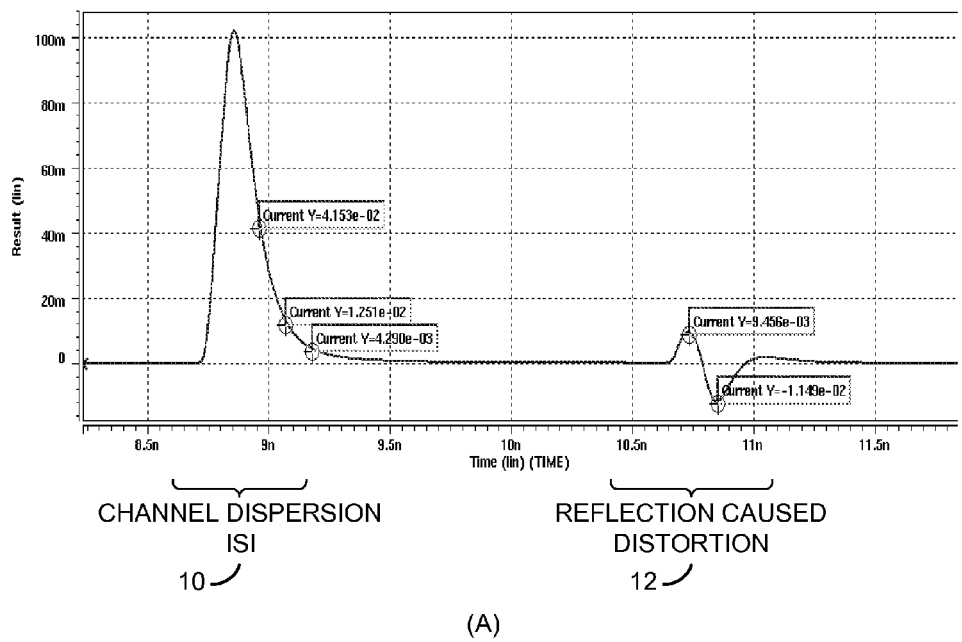
FIG. 1 is a diagram illustrating backplane channel intersymbol interference (ISI) distortion due to finite bandwidth and reflections.
Figure 1:
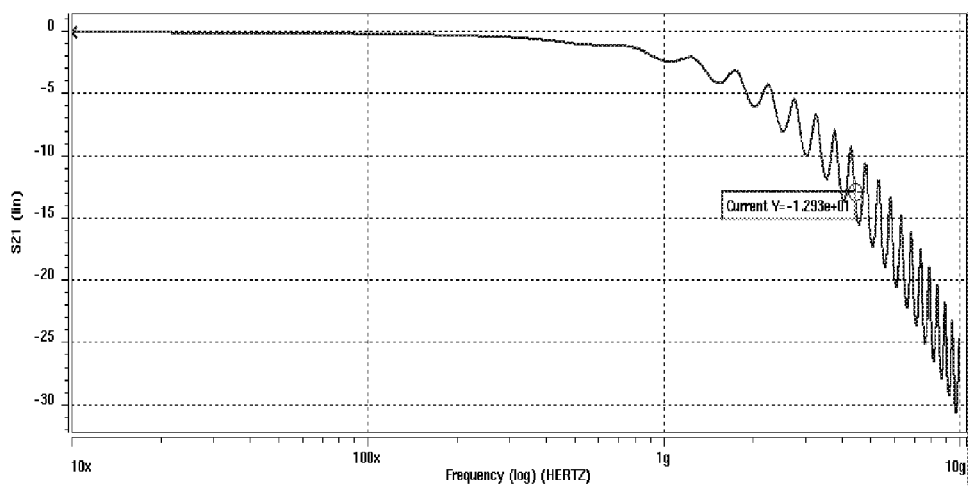

Referring to FIG. 1, graphs are shown illustrating an example backplane channel pulse response (A) and channel frequency response (B). The channel pulse response may comprise dispersive inter symbol interference (ISI) 10 and distortions 12. The distortions 12 may result from finite channel bandwidth and/or reflection due to impedance discontinuities. In a typical backplane, a signal path may include many elements such as vias, connectors and package parasitics. Each of the many elements may present a potential impedance discontinuity. However, the impedance discontinuity usually happens only in a few locations along the backplane channel as illustrated in FIG. 1. A majority of the symbols previously received do not impact a current symbol. In general, only those symbols affecting the current symbol need to be filtered and subtracted from current symbol. With increasing data rate, a larger portion of signal margin may be consumed by reflections.

A floating-tap decision feedback equalizer (DFE) in accordance with the present invention may be used to cancel not only the dispersive ISI 10, but also the distortions 12 arising from reflections and high-frequency crosstalk. The reflection caused distortion 12 generally has a nature of high latency. The term high latency is used herein to mean that the distortion 12 may come from symbols tens of bits away from a currently received symbol (data). The floating-tap DFE in accordance with the present invention may be configured to provide a feedback filter having an effective length that is long enough to cover the time span of the channel reflection. The floating-tap DFE in accordance with the present invention may reduce a number of feedback taps that are added together with the received signal when compared to a conventional fixed-tap DFE. The reduced number of feedback taps not only makes the implementation of the floating-tap DFE in accordance with the present invention simpler than a conventional fixed-tap DFE, but also may reduce the loading of a summing stage in the DFE circuit and increase the frequency bandwidth of the DFE circuit. Power consumption may also be reduced with fewer feedback taps.

Figure 2:
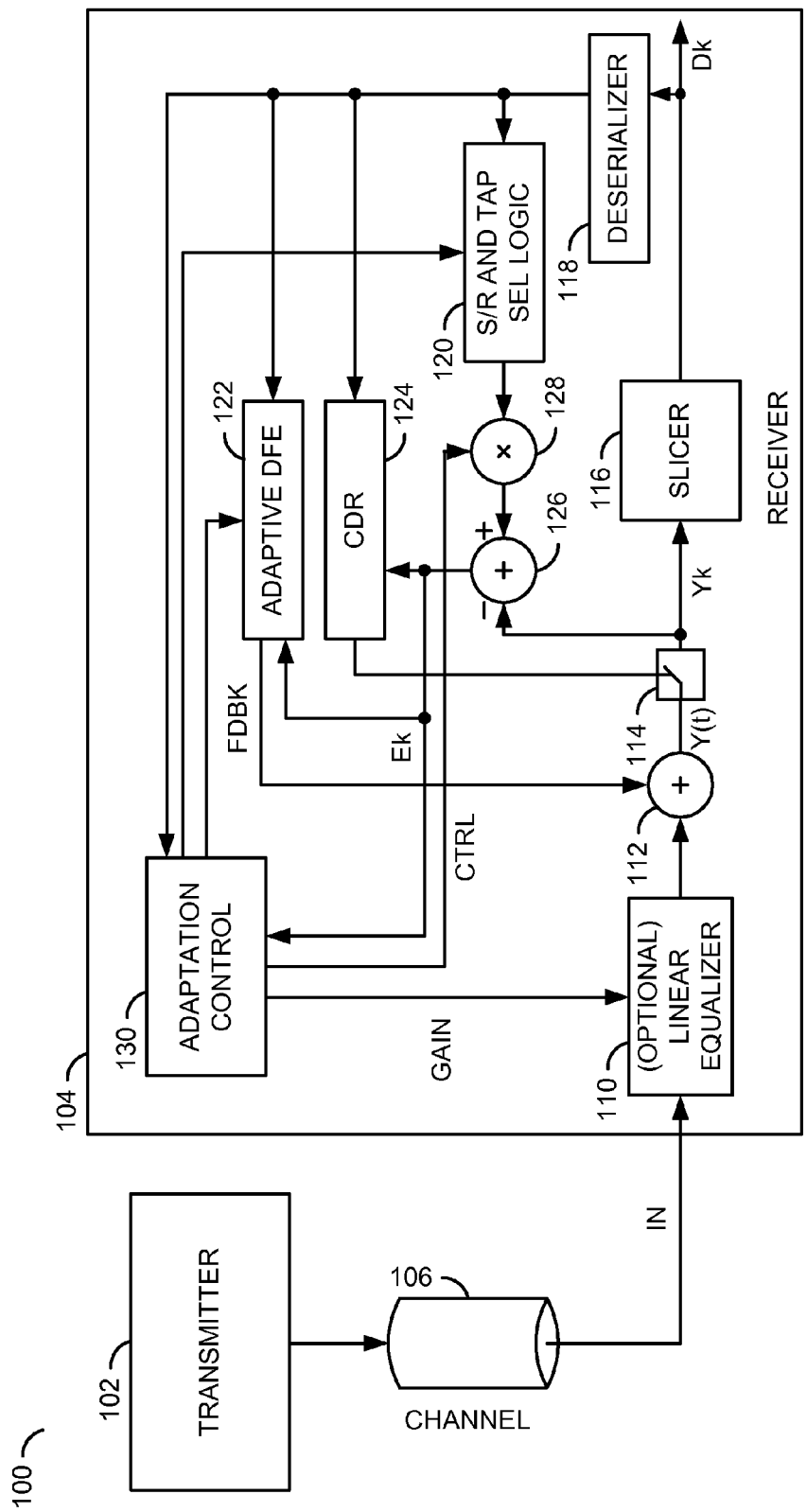
FIG. 2 is a block diagram illustrating a receiver in accordance with an example embodiment of the present invention.

Referring to FIG. 2, a block diagram is shown illustrating a communication channel 100 in accordance with an example embodiment of the present invention. The communication channel 100 may comprise a transmitter 102, a receiver 104 and a channel medium 106. The transmitter 102 and the receiver 104 may be implemented, in one example, on different chips. In one example, the channel medium 106 may be implemented as a circuit board, an optical fiber, a wireless medium, a trace, a cable, air and/or free space.

In one example, the receiver 104 may comprise a module 110, a module 112, a module 116, a module 118, a module 120, a module 122, a module 124, a module 126, a module 128, and a module 130. The modules 110 to 130 may represent circuits and/or blocks that may be implemented as hardware, software, a combination of hardware and software, or other implementations. The module 110 is optional, and may be omitted. The floating tap DFE in accordance with the present invention may be implemented in systems with or without the module 110. When the module 110 is included in the receiver 104, the module 110 may be implemented, in one example, as a receiver feed forward equalizer (RX_FFE). When included in the receiver 104, the optional module 110 may be implemented, in one example, as an analog filter configured to cancel pre-cursor inter-symbol interference (ISI) from the channel 106. In one example, the analog filter may comprise a linear equalizer.

The module 112 may be implemented, in one example, as an adder. The module 114 may be implemented, in one example, as a analog-to-digital (A/D) converter. The module 116 may be implemented, in one example, as a slicer. The module 118 may be implemented, in one example, as a deserializer. The module 120 may be implemented, in one example, as shift registers and tap selection logic in accordance with the present invention. The module 122 may be implemented, in one example, as an adaptive decision feedback equalizer (DFE) in accordance with the present invention. The module 124 may be implemented, in one example, as a baud-rate clock and data recovery (CDR) module. The module 126 may be implemented, in one example, as an adder. The module 128 may be implemented, in one example, as a multiplier. The module 130 may be implemented, in one example, as an adaptation control in accordance with the present invention.

The module 110 may have a first input that may receive a signal (e.g., IN) from the channel medium 106. In one example, the signal IN may be converted from an optical signal to an electrical signal prior to presentation to the input of the module 110. An output of the module 110 may present an equalized version of the received signal with pre-cursor cancellation. When the module 110 is omitted from the receiver 104, the signal IN may be received from the channel 106 at a first input of the module 112. When the receiver 104 includes the module 110, the first input of the module 112 may receive the equalized version of the signal IN with pre-cursor cancellation from the output of the module 110. The module 112 may have (i) a second input that may receive a feedback signal (e.g., FDBK) from an output of the module 122 and (ii) an output that may present a signal (e.g., Y(t)). The signal Y(t) may comprise a sum of the feedback signal FDBK and either (i) the signal IN from the channel medium 106 or (ii) the equalized signal from the module 110.

The module 114 may have a first input that may receive the signal Y(t) and an output that may present samples (e.g., Yk) of the signal Y(t) to an input of the module 116 and a first input of the module 126. The module 114 may sample the signal Y(t) in response to an output of the module 124. An output of the module 116 may present a data output signal (e.g., Dk).

The signal Dk may be presented to an input of the module 118. An output of the module 118 may be presented to a first input of the module 120, a first input of the module 122, a first input of the module 124, and a first input of the module 130. An output of the module 120 may present a signal to a first input of the module 128. An output of the module 128 may present a signal to a second input of the module 126. The signal presented at the output of the module 128 may comprise a product of the signal Dk and a signal (e.g., CTRL) received from a first output of the module 130. An output of the module 126 may present a signal (e.g., Ek) to a second input of the module 122, a second input of the module 124 and a second input of the module 130. A second output of the module 130 may present a signal to a third input of the module 122. A third output of the module 130 may present a signal to a second input of the module 120.

When the receiver 104 includes the module 110, the module 126 may have a fourth output that may present a signal (e.g., GAIN) that may be presented to a second input of the module 110. The signal GAIN may comprise an equalizer parameter signal. In one example, the signal GAIN may comprise a digital representation of a gain value set by the module 110. In another example, the signal GAIN may comprise signals for controlling a gain adaptation loop implemented within the module 110.

The signal Ek may comprise an error signal. The signal CTRL may comprise a target signal amplitude (e.g., H0). The target signal amplitude generally represents a desired signal amplitude (e.g., Ek=H0*Dk−Rk). After error is minimized, Rk is close to the desired signal: H0*Dk. The control signals generated by the module 130 may be configured to control activation and scheduling of equalizer adaptation loops of the adaptive DFE 122 and, if implemented, the linear equalizer 110. In one example, the signal presented by the module 130 to the module 110 may be generated according to the equation Ek*D(k+1).

The equalizer adaptation loops of the linear equalizer 110 and the adaptive DFE 122 may be implemented using conventional techniques modified to allow control in accordance with the present invention. In one example, the adaptive DFE 122 may be implemented as a floating-tap DFE. For example, the adaptive DFE 122 may be implemented in accordance with commonly-owned, co-pending application U.S. Ser. No. 11/777,337, filed Jul. 13, 2007, which is herein incorporated by reference in its entirety. The floating tap DFE generally provides effective cancellation of reflections in the channel medium 106.

In one example, the module 110 may use a simple analog filter to cancel the pre-cursor inter symbol interference (ISI) received at the receiver 104. In one example, the analog filter may be implemented as a 1-tap finite impulse response (FIR) filter. However, higher order FIR filters may be implemented accordingly to meet the design criteria of a particular implementation. In one example, the analog filter may be configured to provide 10% precursor de-emphasis. In one example, the module 110 may be implemented using a linear equalizer described in U.S. application Ser. No. 12/435,538, filed May 5, 2009, which is incorporated herein by reference in its entirety.

Figure 3:
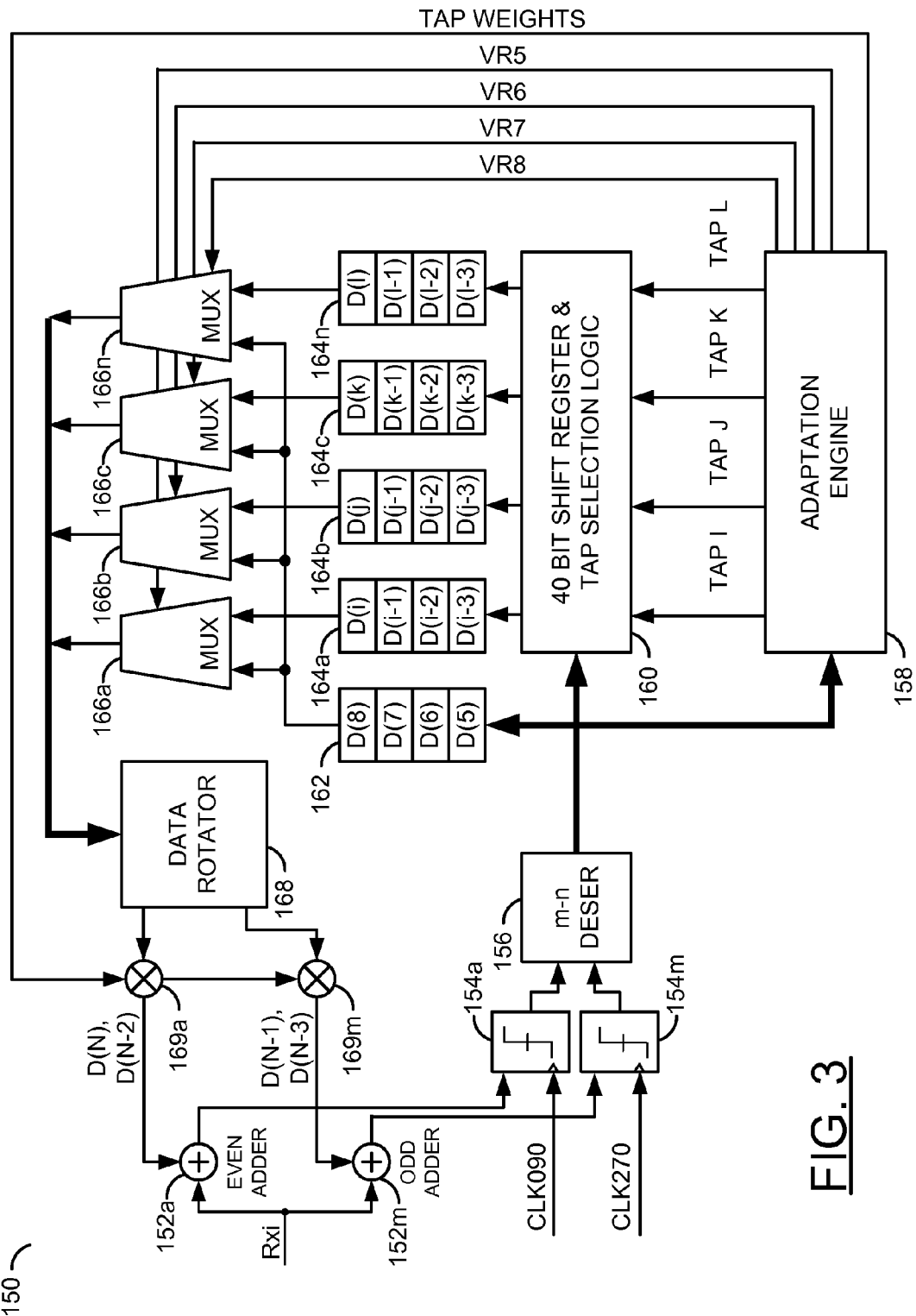
FIG. 3 is a block diagram illustrating an example floating-tap portion of a decision feedback equalizer (DFE) implementation in accordance with an embodiment of the present invention.

Referring to FIG. 3, a block diagram is shown illustrating an example implementation of a floating-tap decision feedback equalizer (DFE) 150 in accordance with an embodiment of the present invention. In one example, the example receiver 104 illustrated in FIG. 2 may be implemented using the floating-tap DFE 150. The floating-tap DFE 150 may be implemented with a combination of fixed-tap and floating-tap feedback. The fixed-tap feedback may be implemented using conventional techniques. The fixed tap feedback may be mainly used for channel dispersion cancellation. The channel reflection distortion may be mainly compensated by the floating-tap feedback. The fixed-tap portion of the floating-tap DFE 150 is generally included in the implementation, but is not shown for clarity. Instead, only the data path of the floating-tap portion is illustrated in FIG. 3. The number of fixed-taps and the number of floating-taps used in the floating-tap DFE 150 generally depend on the channel and system specifications. In one example, four fixed taps may be implemented and four floating taps may be chosen, for example, from among forty previously received symbols. However, other numbers of taps and samples may be implemented accordingly to meet the design criteria of a particular implementation.

In one example, the DFE 150 may comprise a number of blocks (or circuits) 152a-152m, a number of blocks (or circuits) 154a-154m, a block (or circuit) 156, a block (or circuit) 158, a block (or circuit) 160, a block (or circuit) 162, a number of blocks (or circuits) 164a-164n, a number of blocks (or circuits) 166a-166n, a block (or circuit) 168, and a number of blocks (or circuits) 169a-169m. The blocks 152a-152m may be implemented as adders. In one example, the number of blocks 152a-152m implemented is two. For example, the block 152a may be implemented as an even symbol adder and the block 152m may be implemented as an odd symbol adder. However, other numbers of blocks 152a-152m may be implemented accordingly to meet the design criteria of a particular implementation.

The blocks 154a-154m may be implemented as sampler (or slicer) circuits. The block 156 may be implemented as a m-n deserializer, where m and n are integers and m is a factor of n. In one example, the block 156 may be implemented as a 2-4 deserializer (e.g., m=2 and n=4). The block 158 may be implemented as an adaptation engine. The block 160 may be implemented as a shift register and tap selection logic. The blocks 162 and 164a-164n may be implemented as registers. The blocks 166a-166n may be implemented as multiplexers. The block 168 may be implemented as a data rotator. The blocks 169a-169m may be implemented as multipliers. In one example, the number of blocks 169a-169m implemented is two. For example, the block 169a may be implemented as an even symbol multiplier and the block 169m may be implemented as an odd symbol multiplier. However, other numbers of blocks 169a-169m may be implemented accordingly to meet the design criteria of a particular implementation.

From a plurality of data received previously, the floating-tap DFE 150 may choose a subset of data according to the severity of the channel distortion induced by the previously received data on a current symbol. The previously received data may be filtered and subtracted from the current received symbol to cancel the channel distortion. The data are generally stored in a plurality of shift registers in the block 160. The effective depth of the shift registers in the block 160 generally depends on the time span of the channel distortion to be compensated. With the floating-tap DFE in accordance with an embodiment of the present invention, a small number of feedback taps may be used to compensate for the distortion resulting from a symbol received tens of bits before a current symbol. Tap weights and locations of the floating taps in the floating-tap DFE 150 may be fully adaptable.

The floating-tap DFE 150 generally operates at a baud rate that is a fraction of the baud rate of the channel 106. In one example (e.g. m=2 and n=4), the floating-tap DFE 150 may operate at one-half the baud rate of the channel. A received signal (e.g., RXi) and a number of signals from the feedback filter (e.g., D(N), D(N−1), D(N−2), D(N−3)) may be added using the two time-interleaved adders 152a and 152m (e.g., even-bit and odd-bit adders). Fixed tap data may also be added to the sum generated by the adders 152a and 152m. For example, if D0 is the currently received symbol, then the even bit adder 152a only processes even number bit symbols and the odd bit adder 152m processes odd number bit symbols.

The outputs of the adders 152a-152m may be sampled in response to two opposite-phase clocks (e.g., CLK090 and CLK270) by the samplers 154a and 154m, respectively. However, other numbers of phases may be implemented accordingly to meet the design criteria of a particular implementation. In one example, a 2-4 deserialization may be performed on the outputs of the two adders by the block 156. For example, the sampled data from the two adders 154a-154m may be deserialized to four parallel bits. The deserialized data may be presented to an input of the adaptation engine 158, an input of the shift register and tap selection block 160, and an input of the register 162. A sum of the lengths of the shift registers in the shift register and tap selection block 160 generally represents the maximum time span of the channel distortion that may be canceled by the floating-tap DFE 150. In one example, the shift registers may have a total length of 40 bits. Adding more stages of shift register may help cancel higher latency distortion. However, the addition of more stages also may make tap-selection logic more complicated and may increase the propagation delay of the feedback filter.

The adaptation engine 158 generally scans the channel pulse response and locates the symbols with a reflection distortion contribution. The adaptation engine 158 then generates a number of pointers (e.g., tap(i), tap(j), tap(k), tap(l), etc.) at a number of corresponding outputs for presentation to a number of inputs of the shift register and tap-selection logic 160. The shift register and tap selection logic 160 chooses corresponding data (e.g., D(i)D(i−1)D(i−2)D(i−3), D(j)D(j−1)D(j−2)D(j−3), D(k)D(k−1)D(k−2)D(k−3) and D(l)D(l−1)D(l−2)D(l−3)) from the shift register for presentation to inputs of the blocks 164a-164n based upon to the pointers tap(i), tap(j), tap(k) and tap(l). The adaptation engine 158 may have a second set of outputs that may present a number (e.g., n) of signals (e.g., Vr5, Vr6, Vr7, Vr8, etc.) and a number of tap weights (e.g., TAP WEIGHTS). The number of signals Vr5, Vr6, Vr7, Vr8, etc., generally corresponds to the number of shift registers in the block 160 and the number of blocks 166a-166n. The signals Vr5, Vr6, Vr7, and Vr8 may be implemented, in one example, as selection control signals. Values of the signals Vr5, Vr6, Vr7, and Vr8 are generally determined by the adaptation logic 158 based upon locations of reflection distortion contributions. In general, the n selection control signals are generated based upon the number of fixed taps (e.g., Vr(a+1), Vr(a+n), where a represents the number of fixed taps) implemented in addition to the floating taps).

The blocks 166a-166n may have a first data input that may receive a signal from an output of the block 162, a second data input that may receive a signal from an output of a respective one of the blocks 164a-164n, and a control input that may receive a respective one of the selection control signals Vr5, Vr6, Vr7, Vr8, etc. The blocks 166a-166n may also have an output that may present a signal to a first input of the block 168. The block 168 may have first output that may present a number of signals (e.g., even tap values) to a first input of the block 169a and a second output that may present a number of signals (e.g., odd tap values) to a first input of the block 169m. The block 168 generally has m outputs. The detailed operation of the data rotator 168 is generally depicted above in connection with the timing diagram of FIG. 4. The blocks 169a-169m may have second inputs that may receive respective ones of the tap weight signals TAP WEIGHTS from the adaptation engine 158. The block 169a may have an output that may present a number of signals (e.g., D(N), D(N−2), etc.) to the block 152a. The block 169m may have an output that may present a number of signals (e.g., D(N−1), D(N−3), etc.) to an input of the block 152m.

The data D5-D8 are generally stored in the shift registers in the block 160 and in the separate local register 162. The data D5-D8 are generally part of the data for the floating taps. The data D5-D8 are stored locally in the register 162 as well as in the 40 bit shift register because of the proximity of the data D5-D8 the current bit D0. Because the data D5-D8 are too close to current bit D0, the timing margin is not large enough for the data D5-D8 to be saved in the 40 bit shift register and then selected and fed back to the blocks 152a and 152b. When floating tap positions are selected from D5-D8, the corresponding data are passed directly to the multiplexers 166a-166n from the register 162 to save time. The selection controls Vr5-Vr8 generally control whether the multiplexers 166a-166n choose data from the register 162 or the registers 164a-164n.

Figure 4:
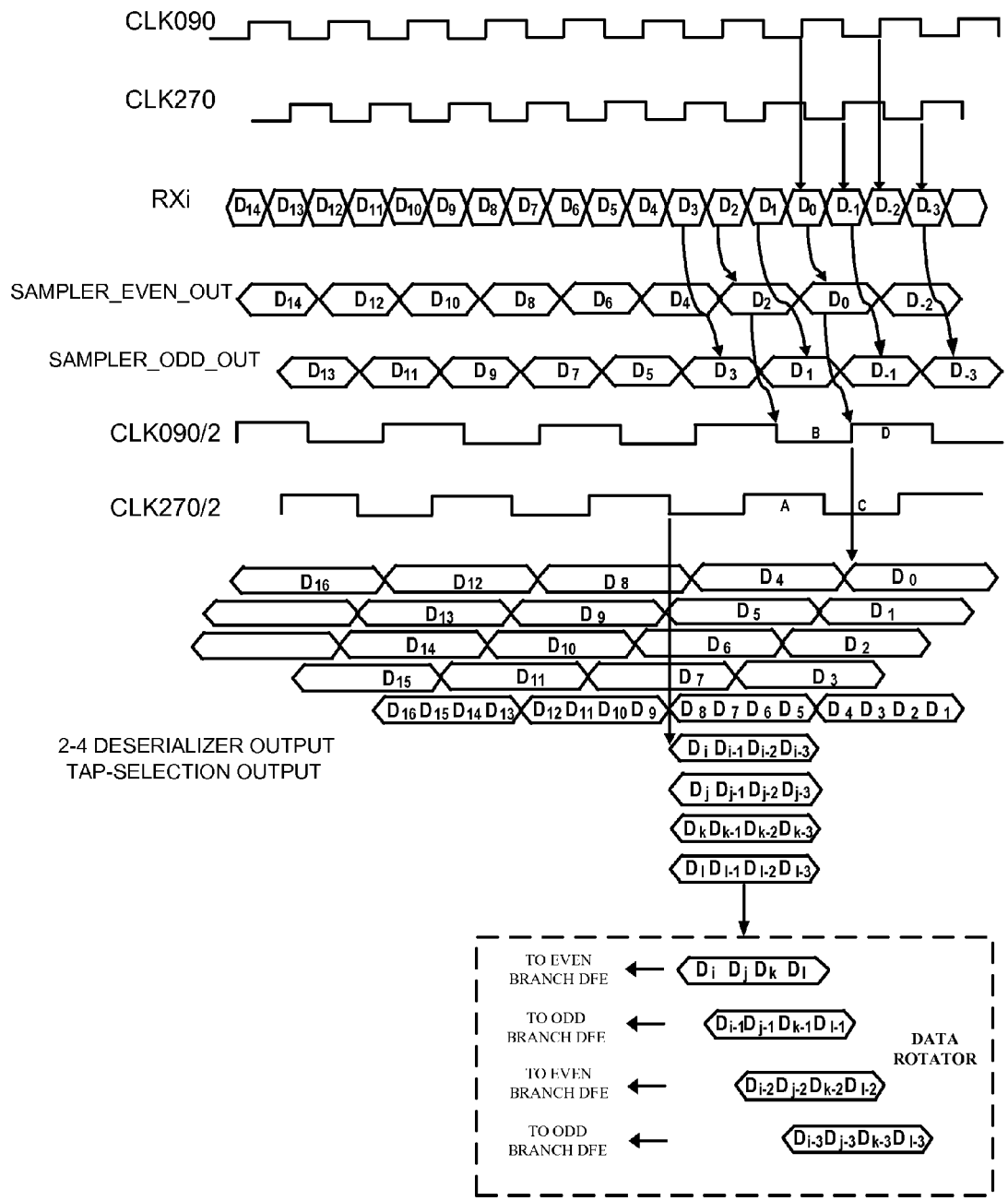
FIG. 4 is a timing diagram illustrating an example operation of the floating-tap DFE of FIG. 3 implemented with a 2:4 deserializer.

Referring to FIG. 4, a timing diagram is shown illustrating an example operation of a floating-tap DFE in accordance with an example embodiment of the present invention. The clock signals CLK090 and CLK180 may be used to sample the input signal RXi in interleaved mode. The signal D0 generally represents the current bit. After adding with feedback data, the current bit may be sampled by the clock signal CLK090. The clock signal CLK090 may also be used to sample the other even data bits. The clock signal CLK270 may be used to sample the bit D1 and all other odd data bits.

The clock signals CLK090 and CLK270 may be divided by 2 to generate two (e.g., a first and a second) divided clock signals (e.g., CLK090/2 and CLK270/2). However, other numbers of clock signals may be generated accordingly to meet the design criteria of a particular implementation. The divided clock signals CLK090/2 and CLK270/2 may be used to deserialize the sampled data to four parallel data. In one example, the parallel data may be clocked into the shift registers of the shift register and tap selection logic block 160 on a falling edge of the divided clock signal CLK270/2. In one example, the shift register and tap selection logic block 160 may output selected sampled data (e.g., D(i)D(i−1)D(i−2)D(i−3), D(j)D(j−1)D(j−2)D(j−3), D(k)D(k−1)D(k−2)D(k−3) and D(l)D(l−1)D(l−2)D(l−3)) from the shift registers at the falling edge of the divided clock signal CLK270/2, for presentation to the shift registers 164a-164n, based upon the pointers tap(i), tap(j), tap(k) and tap(l). The selected sampled data are generally in alignment with D5-D8 of the deserializer output data that may be stored in the register 162.

Figure 5:
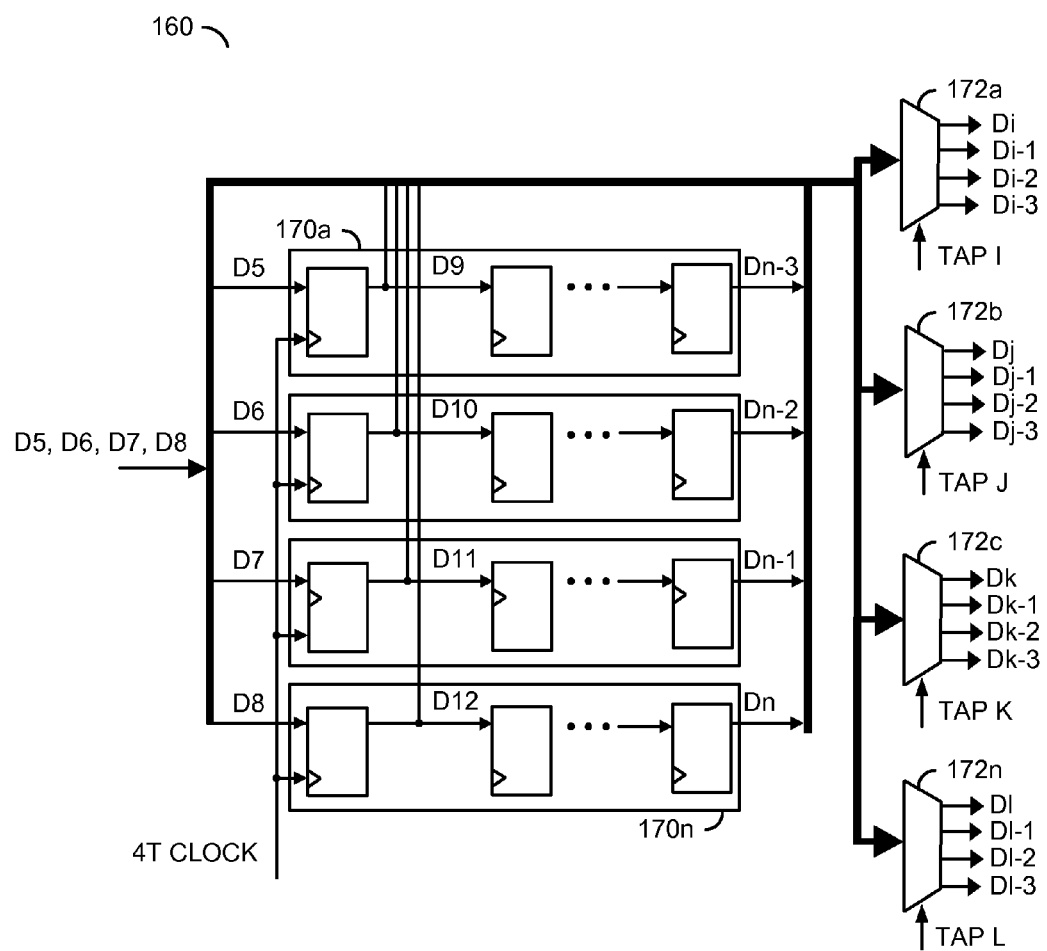
FIG. 5 is a block diagram illustrating an example shift register and tap-selection logic of FIG. 3.

Referring to FIG. 5, a block diagram is shown illustrating an example implementation of the shift register and tap-selection logic 160 of FIG. 3. In one example, the shift register and tap-selection logic block 160 may comprise a number of shift registers 170a-170n and a number of blocks 172a-172n. The shift registers 170a-170n may be implemented, in one example, using flip-flops. However other types of storage (memory) elements may be implemented accordingly. The blocks 172a-172n may be implemented, in one example, as multiplexers. Each of the flip-flops (or storage elements) in the shift registers 170a-170n may be configured to latch a sample in response to a clock signal (e.g., a NT clock, where T represents one symbol period). In the above example where a 2-4 deserializer is implemented, the clock signal may be implemented as a 4T clock. The number of shift registers 170a-170n, the number of multiplexers 172a-172n and the clock rate may be scaled accordingly to meet the design criteria of a particular implementation.

Each of the blocks 170a-170n may have outputs that may be presented to a data input of each of the blocks 172a-172n. Each of the blocks 172a-172n may have a control input that may receive a respective one of the pointers tap(i), tap(j), tap(k) and tap(l). Each of the blocks 172a-172n may also have a number of outputs that may present the selected sampled data corresponding to the pointers tap(i), tap(j), tap(k) and tap(l). In general, for each tap chosen (e.g., tap(i), tap(j), tap(k) and tap(l)), the next 3 sequential symbols may be chosen at the same time. For example, if D(i) is selected, D(i−1), D(i−2), and D(i−3) are selected also. Each set of selected sampled data may comprise, in one example, four symbols. However, other numbers of symbols may be implemented accordingly to meet the design criteria of the particular implementation.

The term D(i) generally refers to the ith previously detected data before the current symbol. The term D(−k) is used to refer to the symbol that will be received next kth symbol after the current symbol. The symbols D(1), D(2), D(3) and D(4) are generally used in a fixed-tap portion of the DFE 150 to equalize the current symbol D(0) with ISI coming from symbols 1, 2, 3, and 4 received earlier from the current symbol.

The symbols D(5) to D(N) may be used for floating-tap DFE, where N is the effective depth of the shift register provided by the DFE 150. The symbols D(5), D(6), D(7) and D(8) may be stored in the register 162 while the symbols D(5)-D(N) are stored in the shift registers of the block 160. The reason for storing symbols D(5)-D(8) in the register 162 as well as the shift registers of the block 160 is because the propagation time through the shift registers and the selection logic of the block 160 is generally around 2T and the timing margin to feedback these data to the DFE summing stage (e.g., blocks 152a-152m in FIG. 3) is generally less than 2T, where T represents one symbol period.

Referring again to FIG. 3, the selected sampled data from the block 160 is generally stored in the registers 164a-164n. The multiplexers 166a-166n may be used to select the feedback data either from the register 162 or the respective register 164a-164n. The signals Vr5, Vr6, Vr7 and Vr8 generally represent selection controls of the multiplexers 166a-166n. The selection controls are generally received from the adaptation engine 158. When the adaptation engine 158 finds that ISI comes from one of the symbols of D(5), D(6), D(7), or D(8), the corresponding selection control may be set, for example, to "1". For example, if D(5) is selected as one of feedback taps, Vr5 is set to "1" and controls the multiplexer 166a to select D(5) from the output of the register 162 instead of a signal from the output of the register 164a.

The selected feedback data (e.g., D(i)D(i−1)D(i−2)D(i−3), D(j)D(j−1)D(j−2)D(j−3), D(k)D(k−1)D(k−2)D(k−3) and D(l)D(l−1)D(l−2)D(l−3)) at the output of the shift register and tap selection logic 160 are generally latched by the registers 164a-164n and presented in parallel mode. The signals Vr5, Vr6, Vr7 and Vr8 determine which feedback data is generally sent to the data rotator 168. The data rotator 168 rotates the selected feedback data such that the selected feedback data adds with the proper received input symbols. For example, D(i)D(i−1)D(i−2)D(i−3) may be rotated so that D(i), D(i−2) add with D(0) and D(−2), respectively, using the even bit adder 152a, and D(i−1), D(i−3) add with D(−1) and D(−3) using the odd bit adder 152m. The multipliers 169a-169m multiply the feedback data with respective tap weights prior to presentation to the adders 152a-152m.

Figure 6:
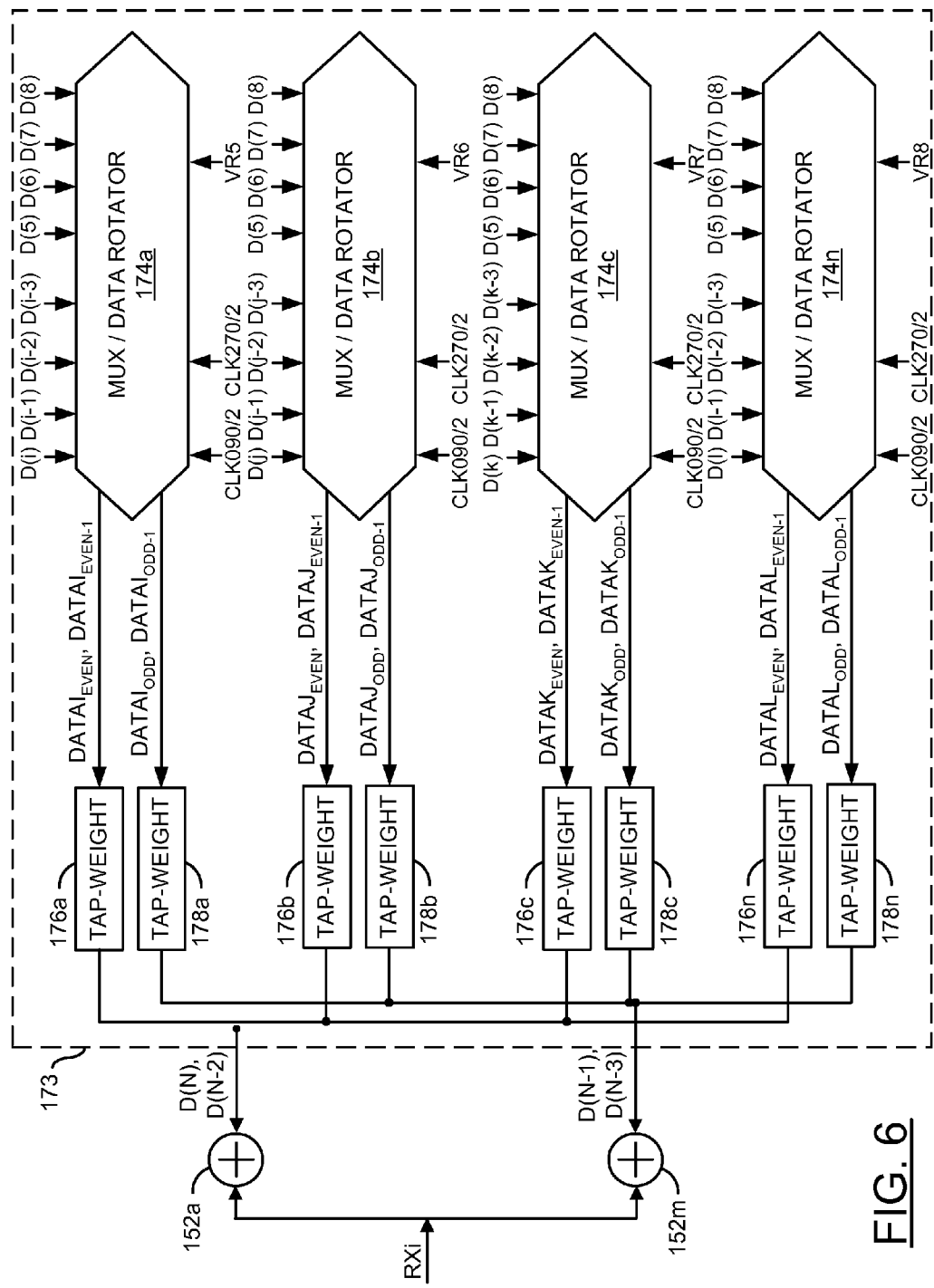
FIG. 6 is a block diagram illustrating an example implementation of a number of multiplexers, a data rotator block, and a number of multipliers of FIG. 3.

Referring to FIG. 6, a block diagram is shown illustrating an example implementation of a block (or circuit) 173 in accordance with an embodiment of the present invention. The block 173 may combine the functions of the multiplexers 166a-166n, the data rotator 168, and the multipliers 169a-169m depicted in FIG. 3. The block 173 may comprise a number of multiplexer/data rotators and a number of tap weight multipliers. The numbers of multiplexer/data rotators and tap weight multipliers may be determined by the deserializer ratio of the deserializer 156 and the number of adders 152a-152m. For example, with a deserializer ratio of M:N, the block 173 may comprise N multiplexer/data rotators and 4*N tap weight multipliers. The 4*N tap weight multipliers may be arranged into M groups. In an example where M=2 and N=4, the block 173 may be implemented with four multiplexer/data rotators 174a-174n, four even tap weight multipliers 176a-176n and four odd tap weight multipliers 178a-178n. Each of the data rotators 174a-174n may have eight data inputs, two clock inputs and two data outputs.

The data inputs of the data rotator 174a may receive taps D(5), D(6), D(7), D(8), D(i), D(i−1), D(i−2), and D(i−3), where i>8. The clock inputs of the data rotator 174a may receive the clock signals CLK090/2 and CLK270/2. A first data output of the multiplexer/data rotator 174a may present a first even tap data (e.g., $DATAI_{EVEN}$) and a second even tap data (e.g., $DATAI_{EVEN-1}$). A second data output of the multiplexer/data rotator 174a may present first and second odd tap data (e.g., $DATAJ_{ODD}$ and $DATAJ_{ODD-1}$). The even tap data $DATAI_{EVEN}$ and $DATAI_{EVEN-1}$ may be presented to an input of the tap weight multiplier block 176a. The tap weight multiplier block 176a may have an output that may present weighted even tap data to an input of the adder 152a. The odd tap data $DATAI_{ODD}$ and $DATAI_{ODD-1}$ may be presented to an input of the tap weight multiplier block 178a. The tap weight multiplier block 178a may have an output that may present weighted odd tap data to an input of the adder 152m.

The data inputs of the multiplexer/data rotator 174b may receive taps D(5), D(6), D(7), D(8), D(j), D(j−1), D(j−2), and D(j−3). The clock inputs of the data rotator 174a may receive the clock signals CLK090/2 and CLK270/2. A first data output of the multiplexer/data rotator 174b may present a first even tap data (e.g., $DATAJ_{EVEN}$) and a second even tap data (e.g., $DATAJ_{EVEN-1}$). A second data output of the multiplexer/data rotator 174a may present first and second odd tap data (e.g., $DATAJ_{ODD}$ and $DATAJ_{ODD-1}$). The even tap data $DATAJ_{EVEN}$ and $DATAJ_{EVEN-1}$ may be presented to an input of the tap weight multiplier block 176b. The tape weight multiplier block 176b may have an output that may present weighted even tap data to an input of the adder 152a. The odd tap data $DATAJ_{ODD}$ and $DATAJ_{ODD-1}$ may be presented to an input of the tap weight multiplier block 178b. The tap weight multiplier block 178b may have an output that may present weighted odd tap data to an input of the adder 152m.

The data inputs of the multiplexer/data rotator 174c may receive taps D(5), D(6), D(7), D(8), D(k), D(k−1), D(k−2), and D(k−3). The clock inputs of the data rotator 174a may receive the clock signals CLK090/2 and CLK270/2. A first data output of the multiplexer/data rotator 174c may present a first even tap data (e.g., $DATAK_{EVEN}$) and a second even tap data (e.g., $DATAK_{EVEN-1}$). A second data output of the multiplexer/data rotator 174c may present first and second odd tap data (e.g., $DATAK_{ODD}$ and $DATAK_{ODD-1}$). The even tap data $DATAK_{EVEN}$ and $DATAK_{EVEN-1}$ may be presented to an input of the tap weight multiplier block 176c. The tape weight multiplier block 176c may have an output that may present even weighted tap data to an input of the adder 152a. The odd tap data $DATAK_{ODD}$ and $DATAK_{ODD-1}$ may be presented to an input of the tap weight multiplier block 178c. The tap weight multiplier block 178c has an output that may present weighted odd tap data to an input of the adder 152m.

The data inputs of the multiplexer/data rotator 174n may receive taps D(5), D(6), D(7), D(8), D(l), D(l−1), D(l−2), and D(l−3). The clock inputs of the data rotator 174n may receive the clock signals CLK090/2 and CLK270/2. A first data output of the multiplexer/data rotator 174n may present a first even tap data (e.g., $DATAL_{EVEN}$) and a second even tap data (e.g., $DATAL_{EVEN-1}$). A second data output of the multiplexer/data rotator 174n may present first and second odd tap data (e.g., $DATAL_{ODD}$ and $DATAL_{ODD-1}$). The even tap data $DATAL_{EVEN}$ and $DATAL_{EVEN-1}$ may be presented to an input of the tap weight multiplier block 176n. The tap weight multiplier block 176n may have an output that may present even weighted tap data to an input of the adder 152a. The odd tap data $DATAL_{ODD}$ and $DATAL_{ODD-1}$ may be presented to an input of the tap weight multiplier block 178n. The tap weight multiplier block 178n has an output that may present weighted odd tap data to an input of the adder 152m. Although the example presented in FIG. 6 shows four multiplexer/data rotators and eight tap weight multiplier blocks, it will be apparent to those of ordinary skill in the art that the number of data rotators and tap weight multiplier blocks may be scaled accordingly to meet the design criteria of a particular implementation.

Figure 7:
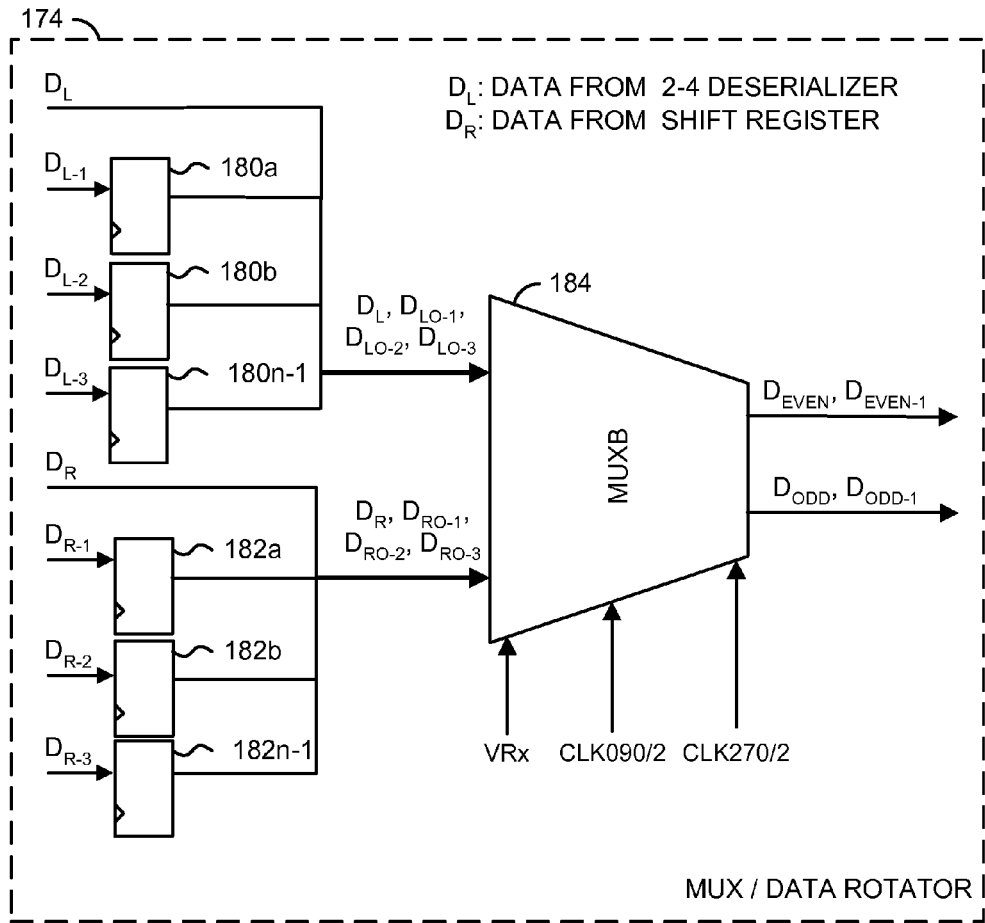
FIG. 7 is a block diagram illustrating an example implementation of a multiplexer/data rotator block of FIG. 6.

Referring to FIG. 7, a block diagram is shown illustrating an example implementation of the multiplexer/data rotators 174a-174n of FIG. 6. In one example, each multiplexer/data rotator 174a-174n may include, a number of flip-flops 180a-180(n−1), a number of flip-flops 182a-182(n−1), and a multiplexer 184. In order to add with proper input data, the sequential data may be shifted by different time delays by the flip-flops 180a-180(n−1) and 182a-182(n−1) in the data rotators 174a-174n. For example, D(i) may already see D(0), so no delay is applied. However, D(i−1) may be delayed by 1T (e.g., by triggering with a rising edge of the divided clock signal CLK090/2), D(i−2) may be delayed by 2T (e.g., triggered with a rising edge of the clock signal CLK270), and D(i−3) may be delayed by 3T (e.g., triggered with falling edge of the divided clock signal CLK090/2). After time shifting, D(i) sees D(0), D(i−1) sees D(−1), D(i−2) sees D(−2), and D(i−3) sees D(−3).

Figure 8:
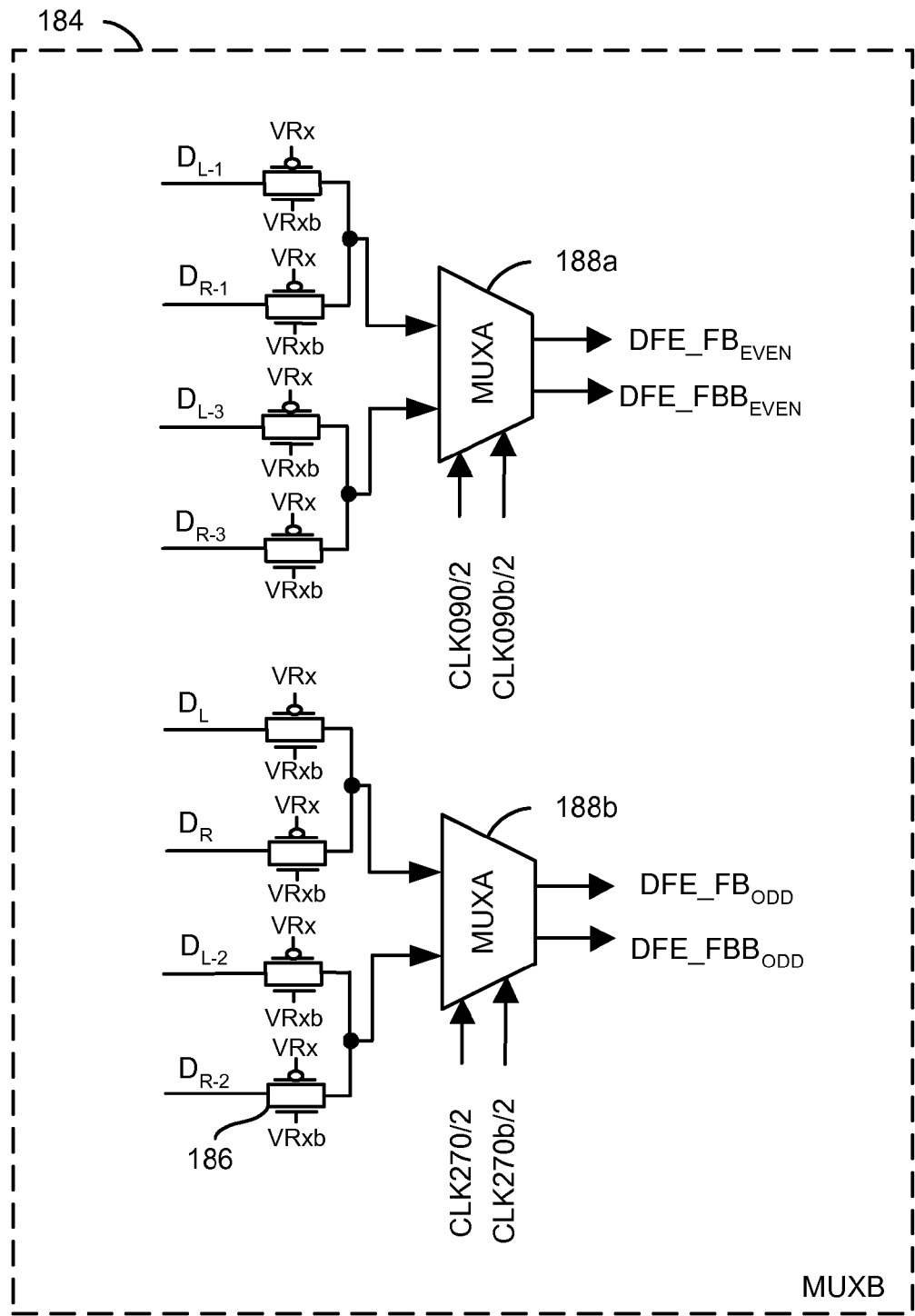
FIG. 8 is a block diagram illustrating an example implementation of a data multiplexer block of FIG. 7.

Referring to FIG. 8, a block diagram is shown illustrating an example implementation of the multiplexer 184 of FIG. 7. In one example, the multiplexer 184 may comprise a plurality of switches 186 and a pair of multiplexers 188a-188b. The multiplexer 184 generally gates the data with different 2T clock phases such that D(i), D(i−1), D(i−2), and D(i−3) add with D(0), D(−1), D(−2), and D(−3), respectively. With reference to the timing diagram of FIG. 4: D(i) may be gated by a "high" level of the divided clock signal CLK270/2; D(i−1) may be gated by a "low" level of the divided clock signal CLK090/2; D(i−2) may be gated by a "low" level of the divided clock signal CLK270/2, and D(i−3) may be gated by a "high" level of the divided clock signal CLK090/2. Since D(i)D(i−1)D(i−2)D(i−3) is a 4T time period, gating the data with 2T clock phases effectively chops the data to a 2T time period. The time period change generally avoids receiver input data being equalized by wrong data bits.

Figure 9:
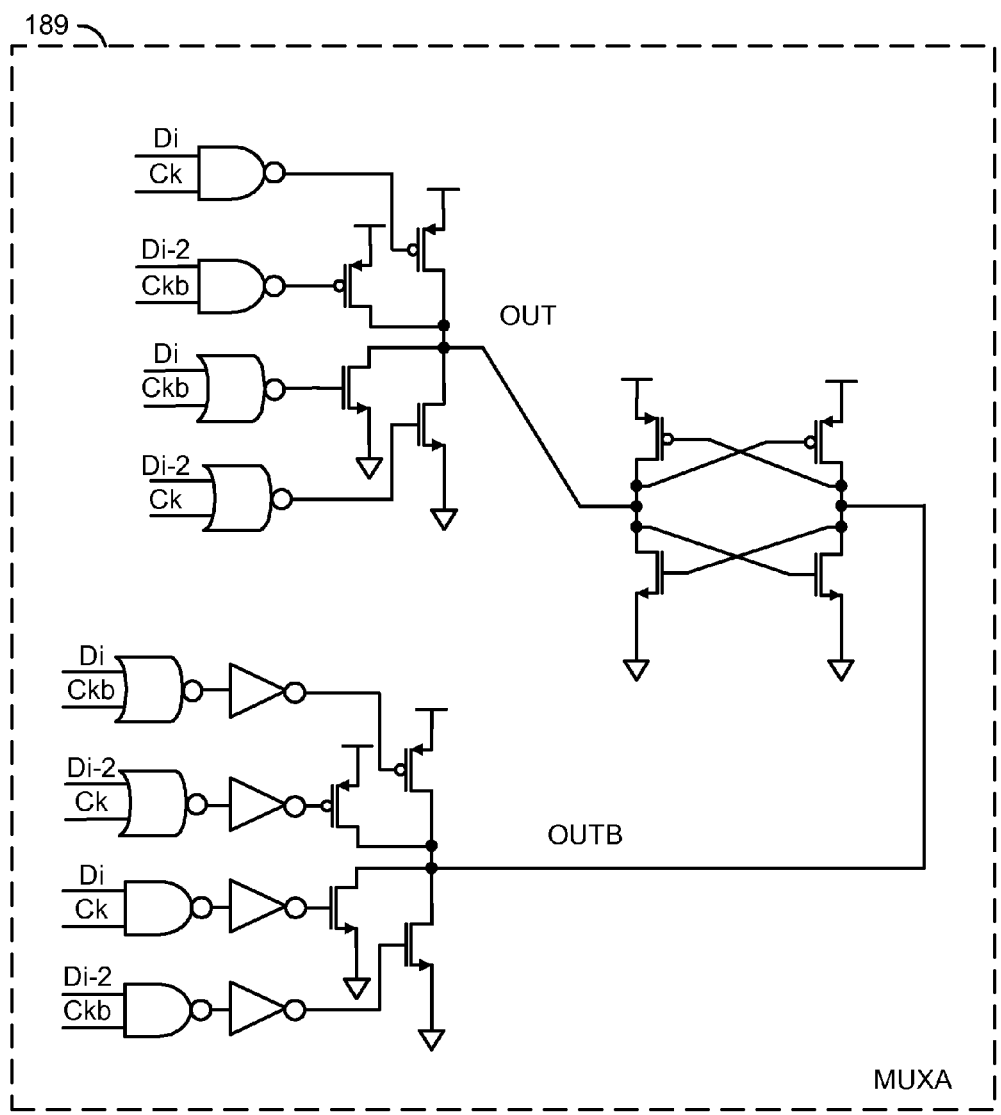
FIG. 9 is a block diagram illustrating an example implementation of a data multiplexer block of FIG. 8.

Referring to FIG. 9, a block diagram is shown illustrating an example implementation of a multiplexer 189 that may be used to implement the multiplexers 188a-188b of FIG. 8. In one example, the multiplexer 189 may comprise a plurality of logic gates (e.g., NAND, NOR, NOT, etc. and a number of transistors (e.g., MOSFETs).

Figure 10:
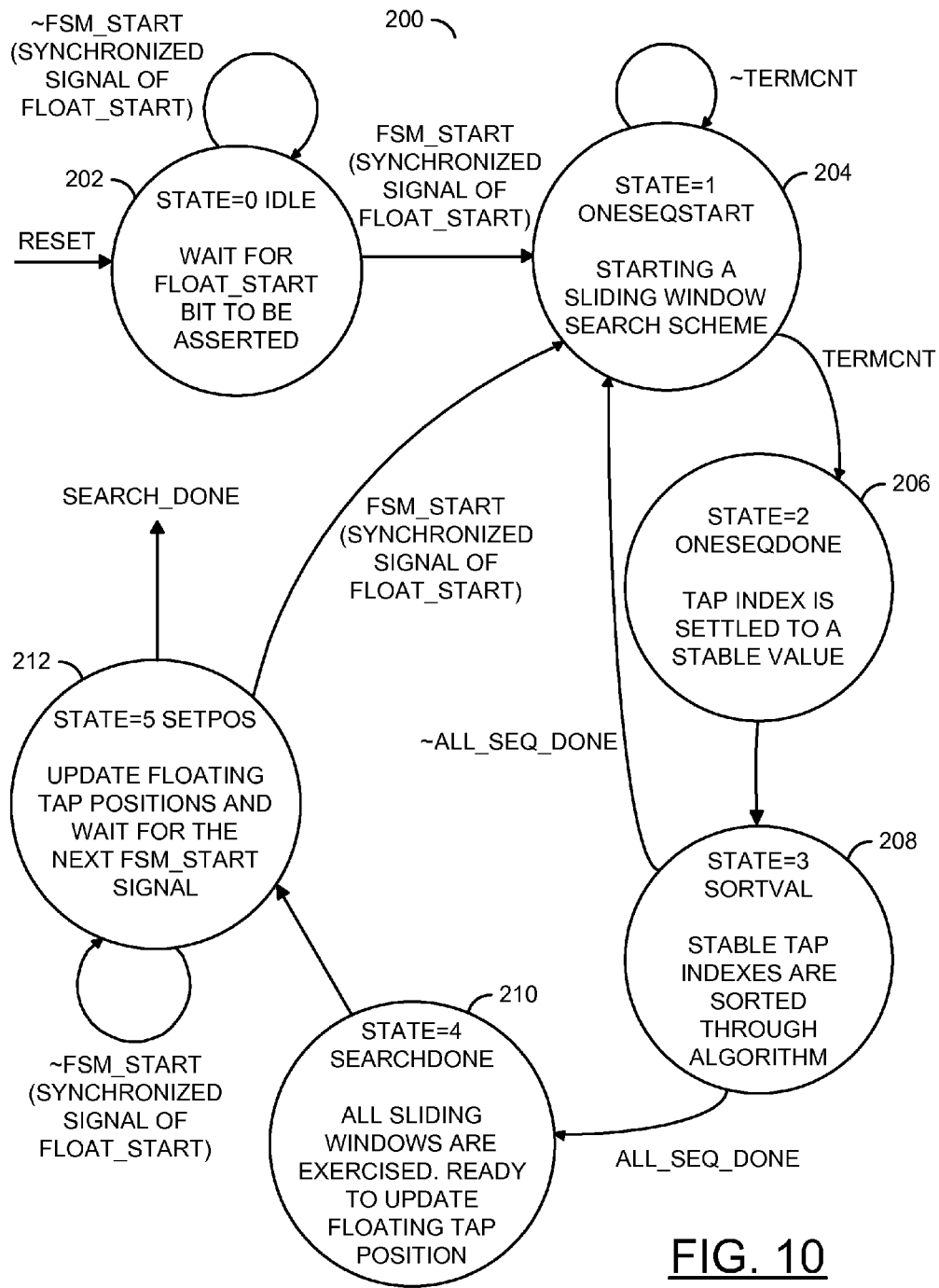
FIG. 10 is a top level diagram illustrating an example state machine implementing a floating-tap search in accordance with an embodiment of the present invention.

Referring to FIG. 10, a diagram is shown illustrating an example state machine 200. The state machine 200 may be used to implement a sliding window based process in accordance with an embodiment of the present invention. The sliding window process may be used, in one example, to scan the channel 106 and search for the floating tap positions. The floating tap locations and tap weights may be fully adapted. The state machine 200 may implement a state 202, a state 204, a state 206, a state 208, a state 210, and a state 212. The state 202 may comprise an idle state. The state 204 may comprise a sequence start state. The state 206 may comprise a sequence done state. The state 208 may comprise a sort values state. The state 210 may comprise a search done state. The state 212 may comprise a set position state.

At start-up, a search engine searches for the locations and tap weights by scanning the channel 106 with a sliding window based process. In one example, each sliding window may consist of M taps (M=4 is used here as an example). When a signal (e.g., reset) is received, the state machine 200 may move to the state 202 and wait for a signal (e.g., FLOAT_START) to be asserted. When the signal FLOAT_START is asserted, the state machine 200 moves to the state 204 and a synchronized version of the signal FLOAT_START (e.g., FSM_START) may be generated.

In the state 204, the first M tap data are input to the DFE adaptation engine to find the corresponding tap weights. The state machine 200 moves to the state 206 and a signal (e.g., TERMCNT) is generated when the tap weights have settled to a stable value, and the tap weights are stored. The state machine 200 then moves to the state 208. In the state 208, the tap weights are compared with previously stored tap weights to find M of most severe reflection taps. If positions remain to be adapted, the state machine returns to the state 204 with a signal (e.g., ALL_SEQ_DONE) deasserted and the next M position data are adapted to find the corresponding tap weights. When all positions have been adapted (e.g., the signal ALL_SEQ_DONE is asserted), the state machine moves to the state 210. In the state 210, the search is done and the floating tap positions are ready for updating. The state machine 200 moves to the state 212 where the floating tap positions are updated and the state machine 200 waits for the next start signal.

The state machine 200 may be implemented with logic that uses a slow clock. In one example, a 256*24 T clock, which is internally divided in digital, may be used. A slow clock may be used because there is no need to run the logic fast. Running the logic faster only increases area and power consumption. Although the non-search mode may be programmed, doing so may raise area concerns. Instead, the state machine 200 allows the user to dynamically recalculate the fluctuating reflection positions (e.g., by switching the signal FLOAT_START on and off). The signal TERMCNT may be implemented as a counter value for DFE tap convergence time+ state machine control time. In one example, 9 sliding window intervals may be used when 4 taps are evaluated in one sliding window. For nine sliding windows, the signal ALL_SEQ_DONE may be asserted when a signal (e.g., ONE_SEQ_DONE) indicating completion of a particular sliding window reaches a predetermined value (e.g., ALL_SEQ_DONE= (ONE_SEQ_DONE==4'b1001). The following TABLE 1 generally illustrates example search times for various values of a signal FLOAT_BW and the signal TERMCNT.

TABLE 1

| float_bw (Tap index bw) | TERMCNT | Total required time for search | in seconds |
|---|---|---|---|
| 0 | $2^3 + 3$ | $256*24T*(9*(2^3 + 3) + 5)$ | 0.085 |
| 5 | $2^16 + 3$ | $256*24T*(9*(2^16 + 3) + 5)$ | 0.482 |
| 6 | $2^18 + 3$ | $256*24T*(9*(2^18 + 3) + 5)$ | 1.93 |
| 1, 2, 3, 4, 7 | $2^20 + 3$ | $256*24T*(9*(2^20 + 3) + 5)$ | 7.71 |

Figure 11:
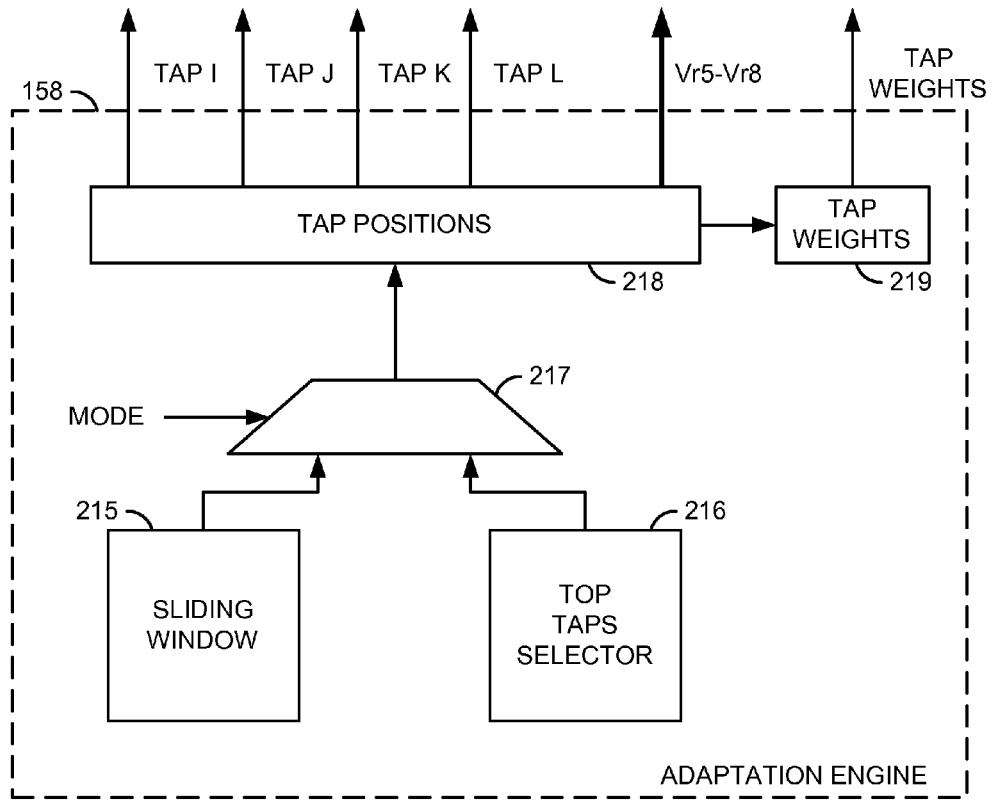
FIG. 11 is a block diagram illustrating an example implementation of the adaptation engine 158 of FIG. 3.

Referring to FIG. 11, a block diagram is shown illustrating an example implementation of the adaptation engine 158 of FIG. 3. The block 158 may comprise a block (or circuit) 215, a block (or circuit) 216, a block (or circuit) 217, a block (or circuit) 218, and a block (or circuit) 219. The block 215 may implement a sliding window technique in accordance with one described in U.S. Non-provisional application Ser. No. 11/777,337, filed Jul. 13, 2007, which is incorporated herein by reference in its entirety. The block 216 may determine a number of floating tap positions (e.g., a top N2 positions out of 2*N2 positions) most likely corresponding with locations of reflections in the communications channel 106. The block 217 may select an output of the block 215 or an output of the block 216 for presentation to an input of the block 218 in response to a signal (e.g., MODE). The signal MODE may have a first state representing a search mode of the DFE 150 and a second state representing an operating mode of the DFE 150. The block 218 may generate the tap position signals (or pointers) tap(i), tap(j), tap(k) and tap(l) in response to the signal(s) received from the block 217.

The signals tap(i), tap(j), tap(k) and tap(l) may be implemented, in one example, as tap selection signals. The block 219 may be configured to generate tap weight signals (e.g., TAP WEIGHTS). The signals tap(i), tap(j), tap(k) and tap(l) generally represent floating tap positions of the DFE 150. The signals TAP WEIGHTS generally represent tap weights corresponding to the floating tap positions associated with the signals tap(i), tap(j), tap(k) and tap(l). The signals TAP WEIGHTS may also include signals representing tap weights corresponding to the fixed tap positions implemented by the DFE 150 (not shown).

Figure 12:
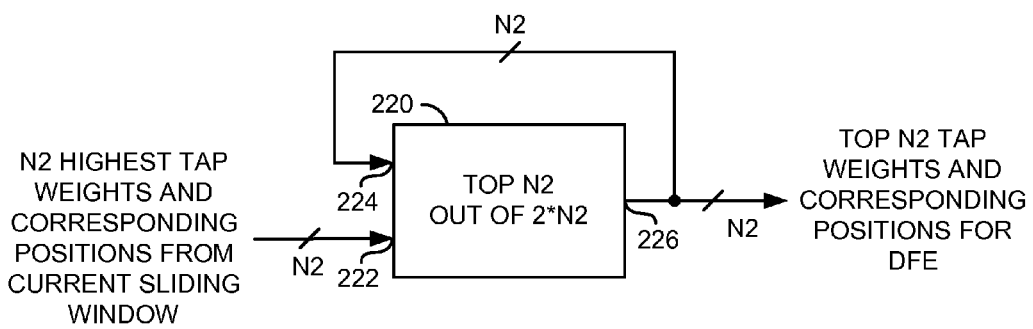
FIG. 12 is a block diagram illustrating a top N2 out of 2*N2 tap candidate selection block in accordance with the present invention.

Referring to FIG. 12, a block diagram is shown illustrating a top N2 out of 2*N2 tap selection block 220 implemented in accordance with a preferred embodiment of the present invention. The block 220 may be implemented as part of the top taps selector block 219 in the adaptation engine 158 (described above in connection with FIG. 11). An initial set of M DFE tap weights and corresponding tap positions may be compared by themselves first according to tap weight magnitude and stored.

Then a new set of M DFE tap weights and corresponding positions may be compared to the stored M taps to obtain the updated top M tap weights in magnitude and corresponding positions. The updated M tap weights and locations may replace the previous ones and are stored for the next comparison. The sequence continues until the sliding window scans the whole channel.

The block 220 may have a first input 222, a second input 224 and an output 226. The input 222 may receive signals representing the tap positions and tap weights of, in one example, N2 floating taps of the DFE. The input 224 may be connected to the output 226 to feedback the output of the block 220 into the decision process implemented by the block 220. The block 220 may be configured to determine the tap positions with the greatest absolute tap weights from among the tap positions represented by the signals presented at (i) the first input 222 and (ii) the second input 224. When the taps presented to the first input are the first taps to be examined (e.g., taps of a first sliding window), the values of the second input may set to zero. Subsequent determinations may be made between tap positions currently presented at the input 222 and the previous determination presented at the input 224.

Figure 13:
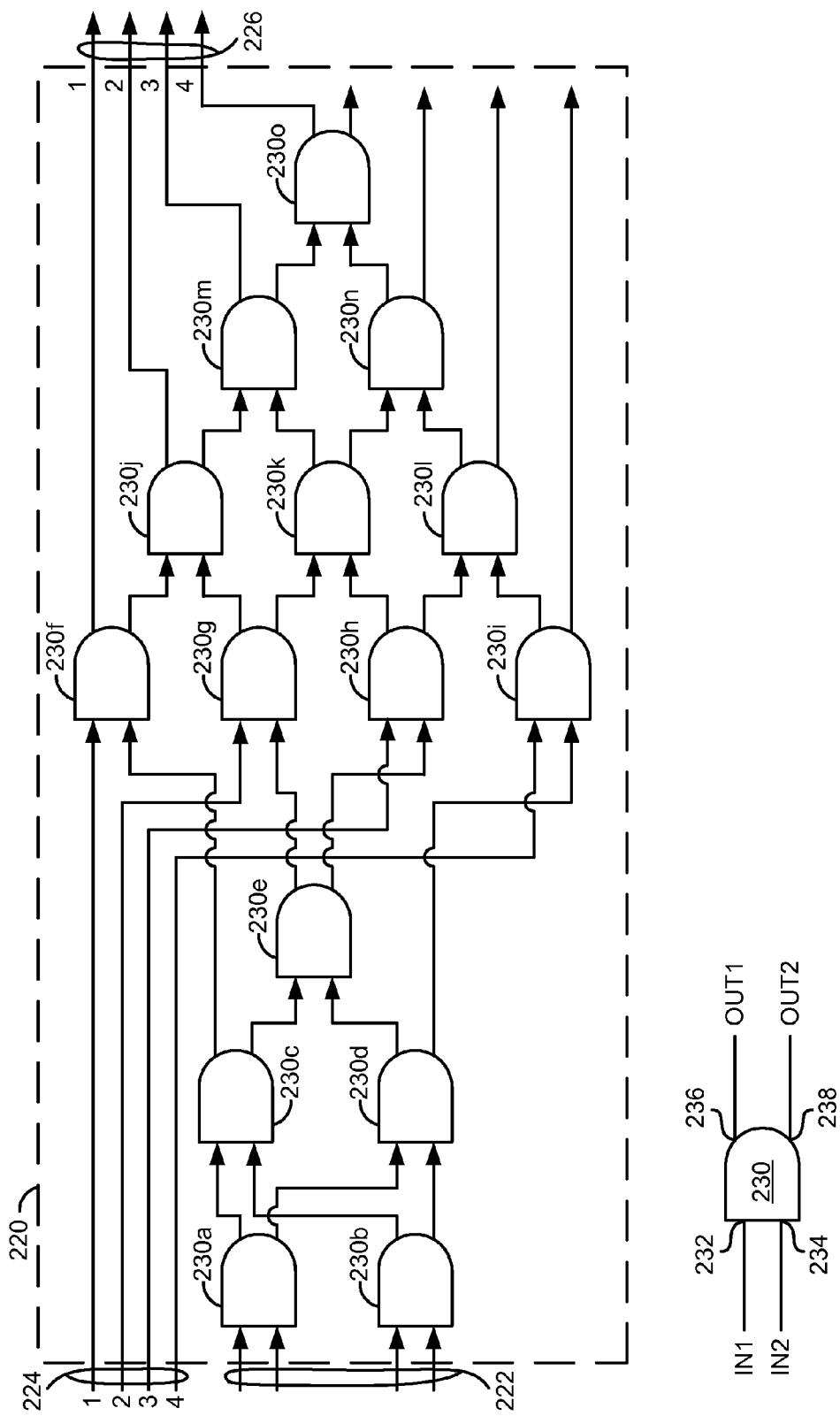
FIG. 13 is a block diagram illustrating an example implementation of the top N2 out of 2*N2 tap candidate selection block of FIG. 12.
Figure 13:
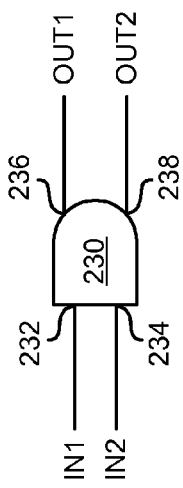

Referring to FIG. 13, a more detailed block diagram is shown illustrating an example implementation of the block 220 of FIG. 11 in accordance with a preferred embodiment of the present invention. In the example above where N2 is implemented with a value of four, the block 220 may comprise a number of blocks 230a-230o. The blocks 230a-230o may be arranged such that the top N2 (e.g., four in the above example) candidates out of 2*N2 (e.g., eight in the above example) candidates are presented at the output of the block 220. In one example, the blocks 230a-230o may be implemented as comparator blocks (or circuits). The blocks 230a-230o may be arranged such that the top N2 candidates out of the 2*N2 candidates at the inputs 222 and 224 are retained and presented at the output 226 of the block 220. The example presented in FIG. 12 may be scaled to meet the design criteria of a particular implementation.

In one example, operation of each of the blocks 230a-230o may be explained using the example comparator 230. The comparator 230 may have an input 232 that may receive a signal (e.g., IN1), an input 234 that may receive a signal (e.g., IN2), an output 236 that may present a signal (e.g., OUT1) and an output 238 that may present a signal (e.g., OUT2). The comparator 230 may be implemented according to the following logic:

```
If |IN1| ≧ |IN2|,
    OUT1 = IN1
    OUT2 = IN2;
else
    OUT1 = IN2
    OUT2 = IN1.
``` as shown in FIG. 12.

Figure 14:
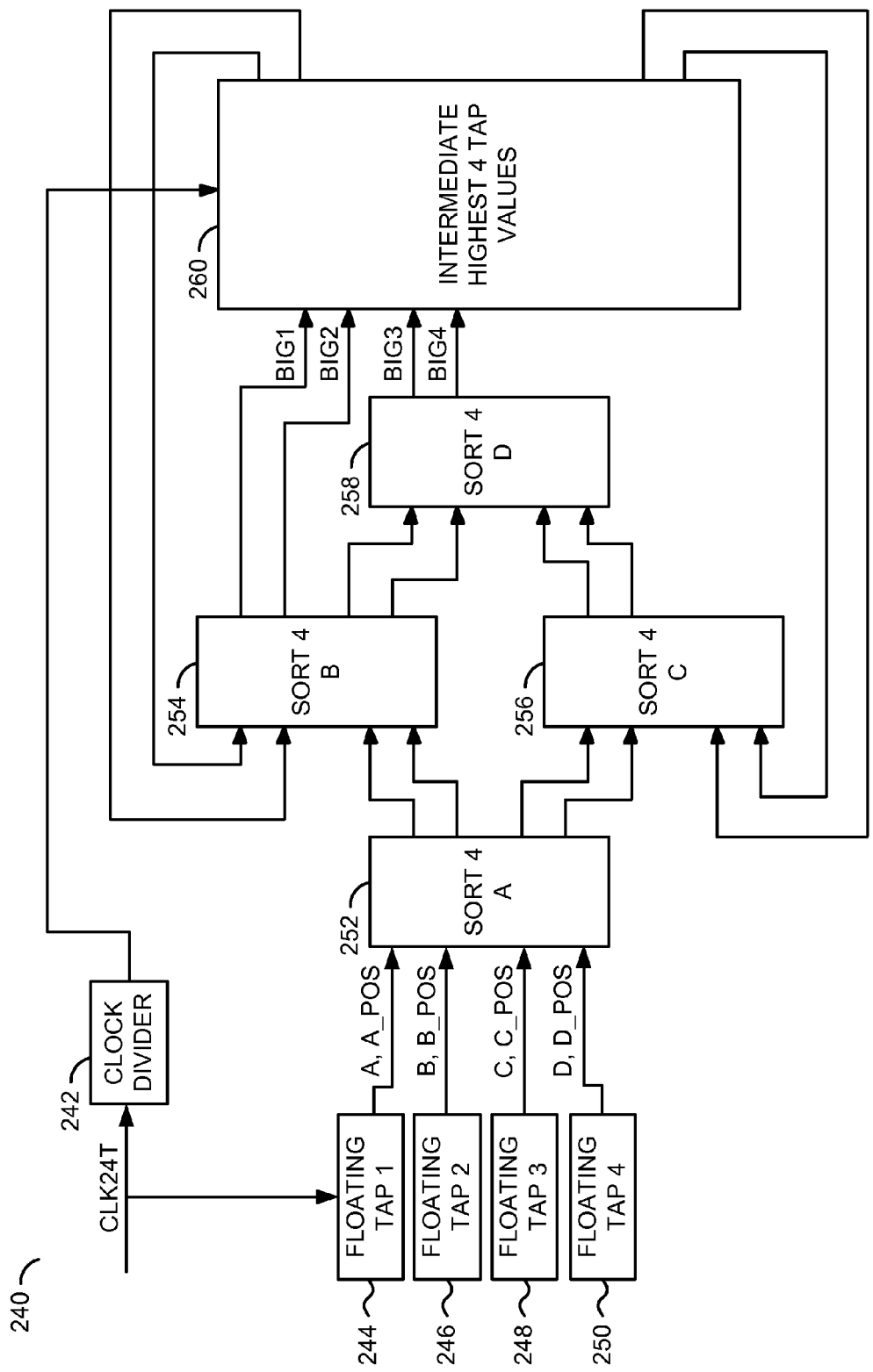
FIG. 14 is a block diagram illustrating an example floating tap search implementation in accordance with the present invention.

Referring to FIG. 14, an alternative circuit 240 is shown for the implementation of the top N2 out of 2*N2 block 220 in FIG. 12, where hierarchy is introduced for easier design, but at a cost of more multiplexers. In one example, the circuit 240 may comprise a block (or circuit) 242, a block (or circuit) 244, a block (or circuit) 246, a block (or circuit) 248, a block (or circuit) 250, a block (or circuit) 252, a block (or circuit) 254, a block (or circuit) 256, a block (or circuit) 258, and a block (or circuit) 260. The block 242 may be implemented as a clock divider circuit.

The blocks 244-250 generally represent floating DFE taps of a current sliding window.

The floating tap adaptation engine 158 generally evaluates the DFE tap-weights of a number of tap positions of a current sliding window at the same time. In one example, the floating tap adaptation engine 158 may be configured to evaluate four taps at a time. However, other numbers of taps may be evaluated at a time to meet the design criteria of a particular implementation. After evaluation is complete, blocks 244, 246, 248 and 250 output the tap-weights (e.g., A, B, C and D) for the four tap positions (e.g., A_POS, B_POS, C_POS and D_POS). The adaptation engine 158 then proceeds to evaluate the next group of tap positions. In one example, the tap weights may be implemented having 3 bits. However, any number of bits may be implemented accordingly to meet the design criteria of a particular implementation.

The tap weights are generally sorted from largest to smallest according to the respective value by the block 252. The first and second largest values from the block 252 are compared in the block 254 with the previous first two largest tap weights that are saved in the block 260. The 3rd and 4th largest values from the block 252 are input to block 256. The block 256 compares the tap weights between the previous 3rd and 4th largest values from the block 260 and the current 3rd and 4th largest values from the block 252. The 1st and 2nd biggest value resulting from the block 254 are saved in the block 260 (e.g., as BIG1 and BIG2). The values BIG1 and BIG2 may be used for the next sorting in the block 254. The 3rd and 4th largest tap weights from the block 254 may be compared by the block 258 with the 1st and 2nd largest tap weights from the block 256. The 1st and 2nd largest tap weights from the block 258 may be saved in the block 260 (e.g., as BIG3 and BIG4) for a next comparison. The above process may continue when new tap weights are generated until all channel positions are considered. When the process is completed, the floating tap adaptation engine 158 has generally found the channel positions with the largest tap weights.

The blocks 252, 254, 256 and 258 are shown with single inputs for clarity. However, tap position indicators are input to the blocks 252, 254, 256, and 258 along with the respective tap weights. When the tap weights are sorted according to the values, the corresponding tap positions are also sorted (e.g., the positions follow the respective tap weights) and saved in the block 260 as BIG1-BIG4.

The blocks 244-250 may output the floating tap weights for the channel positions under evaluation by the adaptation engine 158. The adaptation engine 158 generally operates with 24T clocks. In one example the blocks 252-258 may be implemented as sorting circuits. The block 260 may be implemented as a storage element configured to store intermediate highest tap values for comparison with subsequently determined tap values.

Figure 15:
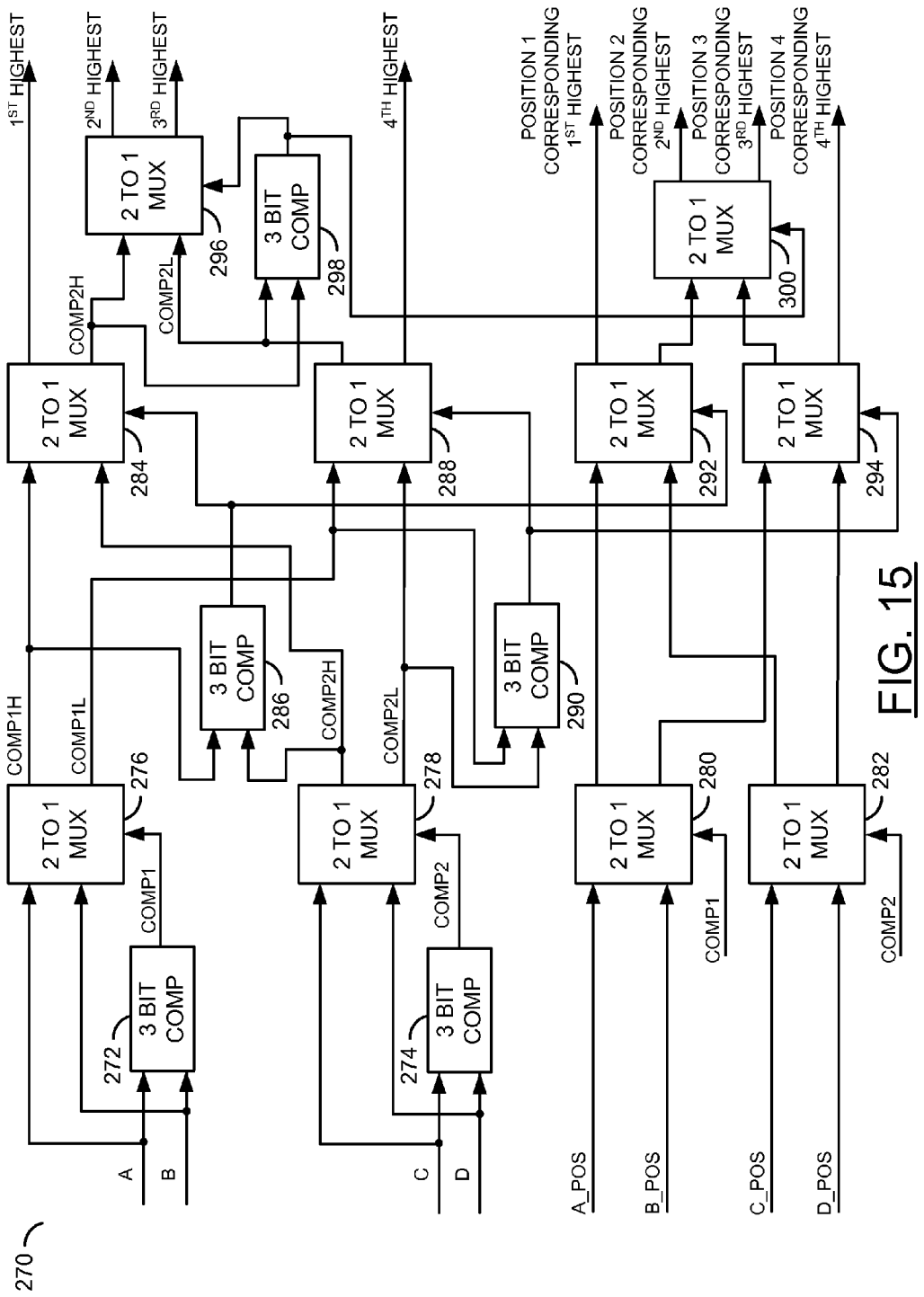
FIG. 15 is a block diagram illustrating an example implementation of a SORT 4 block of FIG. 13.

Referring to FIG. 15, a diagram is shown illustrating an example implementation of a sorting circuit 270 that may be used to implement the blocks 252, 254, 256 and 258 of FIG. 13. In one example, the circuit 270 may comprise a block (or circuit) 272, a block (or circuit) 274, a block (or circuit) 276, a block (or circuit) 278, a block (or circuit) 280, a block (or circuit) 282, a block (or circuit) 284, a block (or circuit) 286, a block (or circuit) 288, a block (or circuit) 290, a block (or circuit) 292, a block (or circuit) 294, a block (or circuit) 296, a block (or circuit 298) and a block (or circuit) 300. The blocks 272, 274, 286, 290, and 298 may be implemented, for example, as 3-bit comparators. The blocks 276-282, 284, 288-296, and 300 may be implemented as 2 to 1 multiplexer circuits.

In one example, the block 270 may have eight inputs that may receive tap weights and tap position values (e.g., A, B, C, D, A_POS, B_POS, C_POS, and D_POS). The values A, B, C and D may represent floating DFE tap weights. The values A_POS, B_POS, C_POS and D_POS may represent the corresponding DFE tap positions. In one example, the tap positions may be implemented as 5-bit values. However, any number of bits may be implemented accordingly to meet the design criteria of a particular implementation. In one example the circuit 270 may be configured to arrange the tap weight and position of each of a number of input signals (e.g., A, B, C, and D) presented at respective inputs of the circuit 270 in order from highest to lowest for presentation at respective outputs of the circuit 270.

A and B may be compared by the block 272. The block 272 generally presents an output that controls the block 276 to direct the bigger of A and B to an output COMP1H and the smaller of A and B to an output COMP1L of the block 276. The comparator 286 generally controls the block 284 so that the bigger of COMP1H and COMP2H is directed to a 1st Highest output of the circuit 270 and the lower of COMP1H and COMP2H is directed to an input of the block 296.

C and D are compared by the block 274 and the operation is the same as for A and B. The comparator 290 compares COMP1L and COMP2L and the result is used to control the block 288 so that the lower one is output as 4th Highest and the larger one is input to the block 292 as COMP2L. The comparator 298 compares COMP2H and COMP2L and the result controls the block 296 so that the larger one goes to the 2nd Highest output of the circuit 270 and smaller one goes to the 3rd Highest output of the circuit 270. The tap-positions A_POS, C_POS and D_POS generally follow the paths of the corresponding tap weights.

Figure 16:
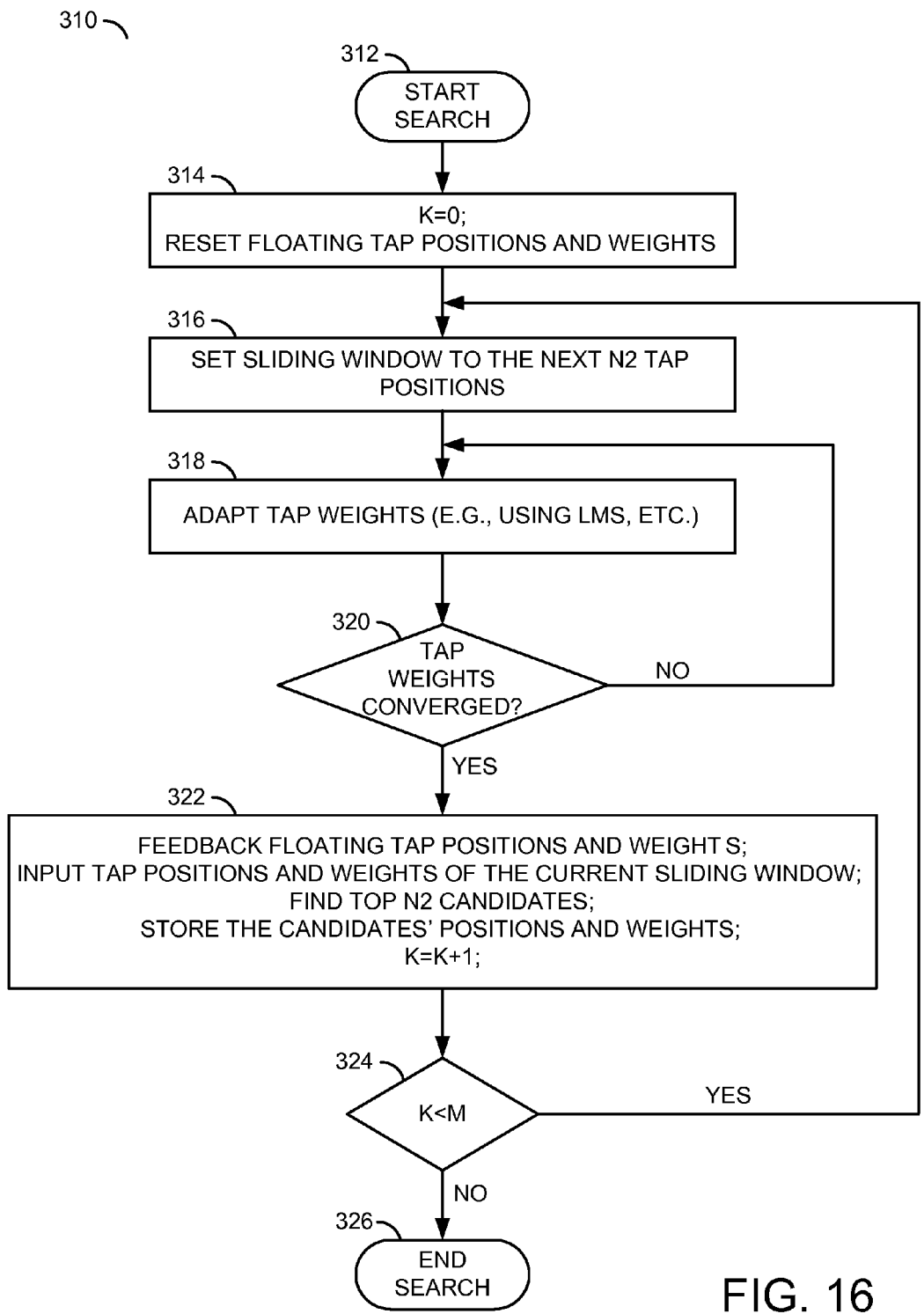
FIG. 16 is a flow diagram illustrating a search process for adaptive selection of floating taps in a decision feedback equalizer in accordance with the present invention.

Referring to FIG. 16, a flow diagram is shown illustrating a search process 310 in accordance with the present invention. The search process 310 may comprise a state 312, a state 314, a state 316, a state 318, a decision state 320, a state 322, a decision state 324, and a state 326. The state 312 may be implemented as a start search state. The state 314 may be implemented as an initialization state. The state 316 may be implemented as a sliding window positioning state. The state 318 may be implemented as an adaptation state. The decision state 320 may be implemented as a convergence decision state. The state 322 may be implemented as a top candidate determining state. The decision state 324 may be implemented as an end of sliding range determination state. The state 326 may be implemented as an end of search state.

Upon entering the search mode 306, the system may start the search process 310 by moving from the start search state 312 to the initialization state 314. In the state 314, the process 310 may set a sliding window index (e.g., K) to zero and reset registers storing the floating tap positions and tap weights. When the sliding window index has been set to zero and the registers storing the floating tap positions and tap weights reset, the process 310 may move to the state 316. In the state 316, the process 310 may start evaluation of the first sliding window by, in one example, setting the tap positions to be 1, 2, 3, . . . , N1, N1+1, N1+2, . . . , N1+N2. While remaining in the search mode, the tap weights of the N1+N2 tap DFE based on the current tap positions may be adapted (e.g., using a least mean squares (LMS) method) until convergence. For example, the process 310 may transition to the state 320 to determine whether the tap weights have converged. In one example, convergence may be determined by comparing the number of symbols since the beginning of the adaptation to a threshold determined from offline simulations. In another example, the tap weights may be checked to determine whether the weights have changed. If the tap weights of the same tap do not change significantly, the tap may be considered to have converged. However, other methods for determining when the adaptation has converged may be implemented to meet the design criteria of a particular implementation.

When the tap weights have not converged, the process 310 may continue adapting the tap weights. When the tap weights have converged, the process 310 may move to the state 322. In the state 322, the process 310 uses the current tap positions and corresponding taps weights and a feedback of previous determined tap positions and corresponding tap weights of the top N2 candidates and selects N2 candidates with the largest tap weights (e.g., in terms of absolute value, etc.). The process 310 may store the selected N2 candidates with the largest tap weights and increment the sliding window index by 1. The process 310 may then move to the state 324.

In the state 324, the process 310 may check to determine whether the search is complete. In an example where a DFE has fixed taps that are contiguous from 1-N1, the process 310 may check whether the sliding window index K is less than the a predetermine number (e.g., M) of slides for covering the range of taps covered by the DFE. If the sliding window index K is less than M, the process 310 may stay in the search mode and return to the state 316 to move the sliding window to the next position (e.g., by setting the tap positions to be 1, 2, 3, . . . , N1, N1+N2+1, N1+N2+2, N1+2*N2. The above processing steps may be repeated until the N2 candidates with the largest tap weight magnitudes (e.g., in terms of absolute value, etc.) among the tap positions from N1+1 to N1+2*N2 are found.

When the sliding window index K has the value M, the process 310 may move to the state 326 to exit the search mode and return to the normal operation mode. When the search mode is exited, the N2 candidates with the largest tap weights (e.g., in terms of absolute value, etc.) among the tap positions from N1+1 to N1+M*N2 have generally been found. The top N2 tap positions found by the process 310 are generally set to be the floating tap positions in the normal operation mode.

The present invention generally uses decision feedback equalization (DFE) to estimate the pulse response of a channel. The DFE tap weights generally provide indications of the pulse response amplitudes at the corresponding tap locations. The DFE tap weights may be adapted (e.g., using a least mean square (LMS) technique, etc.). A sliding window approach in accordance with the present invention may be implemented to search for the floating tap positions quickly and with low implementation complexity. In one embodiment, a first number of taps (e.g., N1) may be fixed and a second number of taps (e.g., N2) may be floating. The N2 tap positions may slide from a current set of N2 tap positions to a next set of N2 tap positions in a next slide. For example, in a first slide, the N2 taps may be positioned at tap positions N1+1, . . . , N1+N2. In a second slide, the N2 taps may slide (or move) to positions N1+N2+1, . . . , N1+N2+N2. The N2 taps may continue sliding for M slides, where M is an integer determined by a width of the sliding window and a range of taps to be covered. By performing M slides with the N2 floating taps, a range of N1+N2*M may be covered using only N1+N2 taps.

In each slide, tap weights of the N1+N2 DFE taps may be adapted using, for example, the LMS method until convergence. The current N2 tap weights may be stored and compared with previous N2 tap weights. The N2 taps with, for example, the largest magnitude (e.g. absolute value) become the new selected taps. For example, the top N2 out of 2*N2 candidates and the respective tap positions may be stored. At the end of the last slide, the positions of the surviving (largest) N2 taps may be set as the floating tap positions for the DFE.

In another embodiment, all of the N1+N2 taps may be allowed to float. In yet another embodiment, the number of taps sliding may be different from the number of taps floating. For example, all N1+N2 taps may slide during a search mode to reduce a corresponding search time. However, in an operating mode, the first N1 taps may be fixed while updates are performed using the N2 floating taps. In another example, N3 taps may be allowed to slide, where N3 may be less than N2.

In one embodiment, the present invention may fix the first four taps because the tap weights of the first four taps are typically larger than the tap weights of the rest of the taps. Fixing the first four taps may help reduce the search time and implementation complexity. In addition to the fixed taps, a number of floating taps may be determined simultaneously. For example, four floating tap positions may be set to be taps 5, 6, 7, and 8. After adaptation, four corresponding tap weights may be determined simultaneously. The four floating tap positions may be moved (or slid) to be taps 9, 10, 11, and 12. The tap weights obtained for taps 9-12 may be compared to the previous four tap weights and the top four tap weights and the corresponding tap positions stored. The four floating tap positions may be set to taps 13, 14, 15, and 16 and the same procedure repeated. In the above example, the present invention may allow determining the four floating tap positions in the range of 40 taps with only nine iterations (or slides). In contrast, the conventional technique would iteratively adapt and check tap weights of all 40 tap positions for each floating tap position for a total of 320 iterations (i.e., 8×40(320)). The conventional technique has a disadvantage of finding duplicate tap positions.

The present invention generally eliminates the duplicate tap positions problem present in the conventional technique. Furthermore, because a number of taps may be fixed to effectively cancel out most of the ISI during a search for floating tap positions, the performance during the search generally does not degrade significantly. Even if only one floating tap at a time is determined using the sliding window technique of the present invention, the search may be completed with 40 slides instead of 320 slides and still provide the benefit of no duplicate tap positions and reduced degradation.

The present invention generally implements a dynamic search. In one embodiment, when a trigger from an external source is received or a timeout event from an internal timer occurs, a search operation for the best floating tap positions may be started to update current tap positions. In another embodiment, a system implementing a DFE in accordance with the present invention may automatically search for the best floating tap positions during initialization and not update the positions once the search is complete. In one example, a system implementing a DFE in accordance with the present invention may search for a number of independent floating tap positions. In another example, a system implementing a DFE in accordance with the present invention may balance performance with simplicity of implementation by implementing a search using a group or multiple groups of consecutive tap positions.

The present invention may be implemented as analog circuitry, digital circuitry and/or a combination of analog and digital circuitry. The present invention may also be implemented as computer executable instructions (e.g., software, firmware, etc.) stored in a computer readable medium. The function performed by the flow diagram of FIG. 16 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to determine values for a predefined metric for a plurality of tap positions within a range covered by a decision feedback equalizer (DFE), wherein said values for a number of taps are determined in parallel; and
a second circuit configured to set one or more floating taps in a feedback path of the DFE to tap positions based upon said values of said predefined metric, wherein the tap positions of the one or more floating taps in the feedback path of the DFE are determined by a sliding window process using a sliding window containing a plurality of tap positions, and said sliding window process comprises adapting tap weights of the DFE to obtain current tap weight magnitudes and, when the tap weights converge, updating tap positions and tap weights of the DFE based upon a comparison of current tap positions and tap weight magnitudes with previous tap positions and tap weight magnitudes.

2. The apparatus according to claim 1, wherein said predefined metric comprises one or more criteria selected from the group consisting of tap weight magnitude, signal-to-noise-ratio (SNR), eye opening and bit error rate (BER).

3. The apparatus according to claim 2, wherein said sliding window process is used to determine the tap positions with larger tap weight magnitudes.

4. The apparatus according to claim 1, further comprising a state machine configured to control said sliding window process, wherein said sliding window process comprises the steps of:
setting a position of said sliding window containing said plurality of tap positions;
adapting the tap weights of the DFE to obtain the current tap weight magnitudes;
when the tap weights converge, comparing the current tap positions and tap weight magnitudes with previous tap positions and tap weight magnitudes; and
updating which tap positions of the DFE have the larger tap weight magnitudes and storing corresponding tap weights.

5. The apparatus according to claim 1, wherein the sliding window process further comprises:
repeating the steps of claim 4 for a plurality of sliding window positions in the range covered by said DFE.

6. The apparatus according to claim 1, wherein for a first sliding window position the previous tap positions and tap weights are set to zero.

7. The apparatus according to claim 1, wherein said floating tap positions are dynamically updated.

8. The apparatus according to claim 1, wherein said floating tap positions are set independently.

9. The apparatus according to claim 1, wherein said floating tap positions are set as a group of consecutive tap positions.

10. The apparatus according to claim 1, wherein said floating tap positions are set as multiple groups of consecutive tap positions.

11. The apparatus according to claim 1, wherein said floating tap positions are updated in real time without interrupting data traffic.

12. The apparatus according to claim 1, wherein said floating tap positions are updated automatically with changes in reflection locations.

13. The apparatus according to claim 1, further comprising a plurality of shift registers connected in parallel and configured to store received data for floating tap equalization.

14. The apparatus according to claim 13, further comprising an adaptation engine configured to generate a plurality of control signals, said plurality of control signals controlling a data rotator to use data stored in a local register instead of data stored in said plurality of shift registers for floating tap equalization when one or more floating taps are within a predetermined distance of one or more fixed taps.

15. The apparatus according to claim 1, wherein one or more taps of said DFE are set to fixed positions to reduce inter symbol interference during a search for said floating tap positions.

16. An apparatus comprising:
a decision feedback equalizer (DFE) having a feedback path comprising one or more fixed taps and one or more floating taps in a normal operation mode;
a state machine configured to (i) switch the DFE to a search mode in response to a trigger event, (ii) set the one or more floating taps of the DFE to tap positions determined using a predefined metric during the search mode, wherein the tap positions of the one or more floating taps in the feedback path of the DFE are determined using a sliding window process using a sliding window containing a plurality of tap positions, and said sliding window process comprises adapting tap weights of the DFE to obtain current tap weight magnitudes and, when the tap weights converge, updating tap positions and tap weights of the DFE based upon a comparison of current tap positions and tap weight magnitudes with previous tap positions and tap weight magnitudes, and (iii) return the DFE to the normal operating mode when all the floating tap positions have been determined; and
a plurality of shift registers connected in parallel and configured to store received data for floating tap equalization.

17. The apparatus according to claim 16, wherein said predefined metric comprises one or more criteria selected from the group consisting of tap weight magnitude, signal-to-noise-ratio (SNR), eye opening and bit error rate (BER).

18. The apparatus according to claim 16, wherein said trigger event comprises one or more types of events selected from the group consisting of a trigger signal from an external source, a timeout event from an internal timer and an initialization of a system containing the DFE.

19. A decision feedback equalizer (DFE) comprising:
a number of fixed taps configured to reduce inter symbol interference (ISI) in a channel;
a number of floating taps configured to reduce reflection distortion contribution in said channel;
a number of adders configured to sum respective received data symbols with respective fixed tap feedback signals and respective floating tap feedback signals;
a number of slicers, each receiving an output of one of said adders;
a deserializer configured to convert outputs of the number of slicers to a parallel format;

a tap adaptation logic configured to generate (i) a number of pointers identifying tap weights and positions for said number of floating taps and (ii) a number of control signals in response to an output of said deserializer;

a plurality of shift registers connected in parallel and configured to store received data from said deserializer for floating tap equalization; and a number of multiplexers configured to generate said floating tap feedback signals in response to (i) values selected from said plurality of shift registers in response to said number of pointers and (ii) said number of control signals.

20. The apparatus according to claim 19, wherein said apparatus comprises a 2T architecture, where T represents a symbol period of said channel.

21. The apparatus according to claim 19, wherein one or more of said plurality of control signals generated by said tap adaptation logic control a data rotator to use data stored in a local register instead of data stored in said plurality of shift registers for floating tap equalization when one or more floating taps are within a predetermined distance of one or more fixed taps.

* * * * *